(12) United States Patent
Kumagai et al.

(10) Patent No.: US 11,949,160 B2
(45) Date of Patent: Apr. 2, 2024

(54) DISTRIBUTED ANTENNA AND DISTRIBUTED ANTENNA SYSTEM

(71) Applicant: AGC Inc., Tokyo (JP)

(72) Inventors: Akira Kumagai, Tokyo (JP); Yasuo Morimoto, Tokyo (JP); Takeshi Motegi, Tokyo (JP); Keisuke Arai, Tokyo (JP); Osamu Kagaya, Tokyo (JP)

(73) Assignee: AGC Inc., Tokyo (JP)

(*) Notice: Subject to any disclaimer, the term of this patent is extended or adjusted under 35 U.S.C. 154(b) by 0 days.

(21) Appl. No.: 17/730,481

(22) Filed: Apr. 27, 2022

(65) Prior Publication Data
US 2022/0255234 A1 Aug. 11, 2022

Related U.S. Application Data

(63) Continuation of application No. PCT/JP2020/040507, filed on Oct. 28, 2020.

(30) Foreign Application Priority Data

Nov. 6, 2019 (JP) ................................. 2019-201844
Dec. 13, 2019 (JP) ................................. 2019-225319
Jan. 22, 2020 (JP) ................................. 2020-007983

(51) Int. Cl.
*H01Q 13/20* (2006.01)
*H01Q 1/42* (2006.01)
*H01Q 21/00* (2006.01)

(52) U.S. Cl.
CPC ........... *H01Q 13/206* (2013.01); *H01Q 1/427* (2013.01); *H01Q 21/0037* (2013.01)

(58) Field of Classification Search
CPC .. H01Q 13/206; H01Q 1/427; H01Q 21/0037; H01Q 1/085; H01Q 1/12;
(Continued)

(56) References Cited

U.S. PATENT DOCUMENTS

| 7,167,129 | B1* | 1/2007 | Strassner, II | ......... | H01Q 9/0407 |
| | | | | | 343/824 |
| 2003/0067411 | A1* | 4/2003 | Paschen | ................. | H01Q 1/286 |
| | | | | | 343/700 MS |

(Continued)

FOREIGN PATENT DOCUMENTS

| CN | 103457023 A | * 12/2013 |
| CN | 206180068 U | 5/2017 |

(Continued)

*Primary Examiner* — Hoang V Nguyen
(74) *Attorney, Agent, or Firm* — Oblon, McClelland, Maier & Neustadt, L.L.P.

(57) ABSTRACT

A distributed antenna includes a strip member extending in a strip-like shape including a dielectric body of a plate shape having a first surface that is one surface of the dielectric body and a second surface that is opposite to the first surface; a transmission line provided on the first surface, on the second surface, or between the first surface and the second surface; and a plurality of antenna elements electrically connected to the transmission line and disposed in a distributed manner on the first surface or on the second surface, or electrically connected to the transmission line and disposed in a distributed manner between the first surface and the second surface.

12 Claims, 45 Drawing Sheets

(58) Field of Classification Search
CPC ............ H01Q 1/36; H01Q 1/246; H01Q 1/50; H01Q 21/12; H01Q 21/205; H01Q 21/24; H01Q 21/00

See application file for complete search history.

(56) References Cited

U.S. PATENT DOCUMENTS

| | | |
|---|---|---|
| 2007/0004363 A1 | 1/2007 | Kusaka et al. |
| 2016/0197411 A1* | 7/2016 | Subbaraman ........ H01Q 21/061 29/600 |
| 2017/0009090 A1* | 1/2017 | Haghzadeh ............. H05K 1/16 |
| 2017/0064810 A1* | 3/2017 | Lewis .................... H05K 1/189 |
| 2019/0036207 A1 | 1/2019 | Kim et al. |
| 2019/0267702 A1 | 8/2019 | Shiroki et al. |

FOREIGN PATENT DOCUMENTS

| | | | |
|---|---|---|---|
| CN | 107275752 A * | 10/2017 | ............... H01Q 1/22 |
| EP | 2214261 A1 * | 8/2010 | ........... H01Q 1/1292 |
| JP | 2012-074866 A | 4/2012 | |
| JP | 5085050 B2 | 11/2012 | |
| JP | 5089908 B2 | 12/2012 | |
| JP | 2014-503149 A | 2/2014 | |
| JP | 2018-067855 A | 4/2018 | |
| JP | 2019-149612 A | 9/2019 | |
| WO | WO 2012/128809 A1 | 9/2012 | |
| WO | WO 2019/150498 A1 | 8/2019 | |

* cited by examiner

| COLUMN DIAMETER | S21(dB) |
|---|---|
| WITHOUT COLUMN | −39.6 |
| COLUMN φ 50 mm | −44.4 |
| COLUMN φ 100 mm | −52.8 |
| COLUMN φ 200 mm | −73.7 |

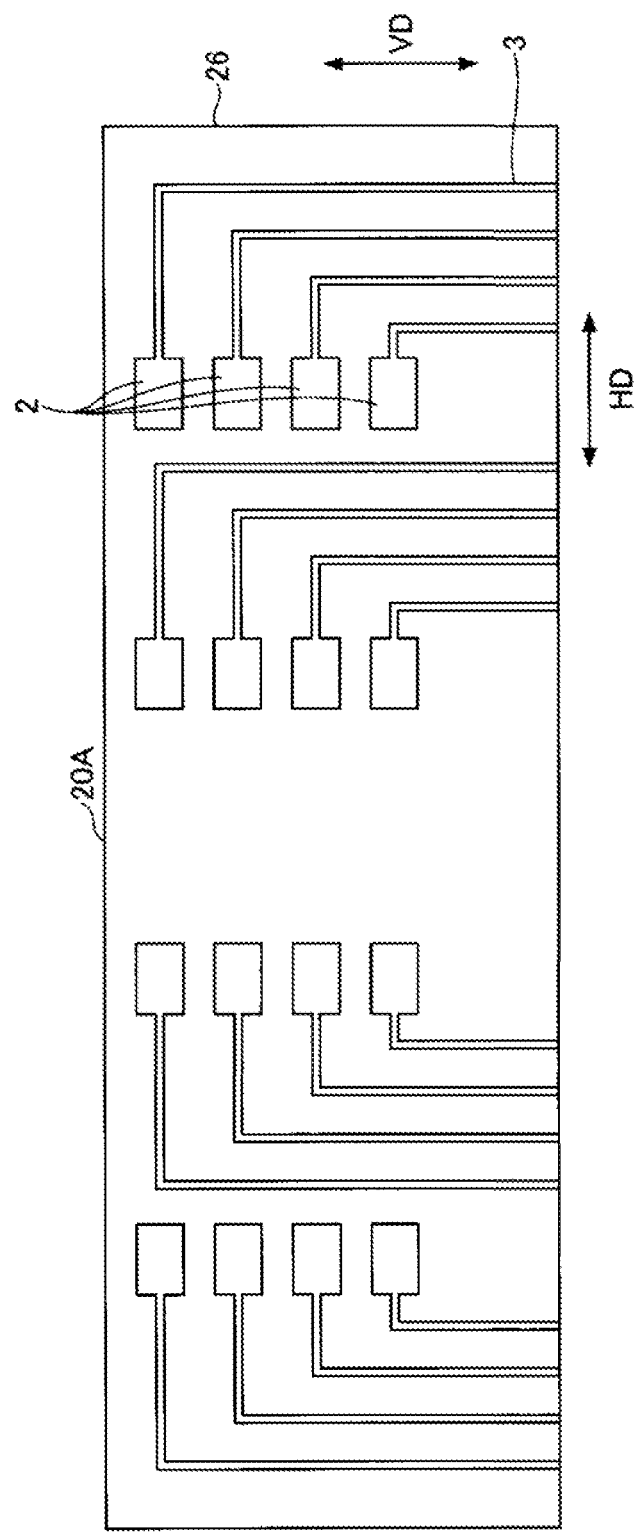

DISTRIBUTED ANTENNA AND DISTRIBUTED ANTENNA SYSTEM

CROSS-REFERENCE TO RELATED APPLICATION

The present application is a continuation application of International Application No. PCT/JP2020/040507, filed Oct. 28, 2020, which claims priority to Japanese Patent Applications No. 2019-201844 filed Nov. 6, 2019, No. 2019-225319 filed Dec. 13, 2019, and No. 2020-007983 filed Jan. 22, 2020. The contents of these applications are incorporated herein by reference in their entirety.

BACKGROUND OF THE INVENTION

1. Field of the Invention

The present disclosure relates to a distributed antenna and a distributed antenna system.

2. Description of the Related Art

Because radio waves of millimeter-wave bands used for antennas such as 5G radio base stations have high rectilinearity, stable communication is difficult when the antennas are concentrically installed. In addition, since installation of radio base stations may be limited due to weight, size, or the like of devices, it may be difficult to increase a number of the radio base stations in order to expand a coverage area.

The distributed antenna system disclosed in Japanese Unexamined Patent Application Publication No. 2018-067855, provided with a baseband unit for generating a high frequency signal, and a plurality of antennas separated from the baseband unit and arranged in a radio-insensitive zone or the like, can expand the coverage area without being restricted by the installation of a radio base station while providing a stable wireless communication in the radio-insensitive zone.

SUMMARY OF THE INVENTION

Problem to be Solved by the Invention

However, in the related art, for example, when a plurality of antennas are installed on a wall of a building, work such as attaching individual antennas one by one to the wall is generated. In addition, it is necessary to train transmission lines connected to these antennas over the wall, and fix them. Accordingly, there has been a problem that the work associated with the installation of the antennas becomes complicated.

The present disclosure has been made in view of the above-described problem, and has an object to provide a distributed antenna that is easy to be installed.

Means for Solving the Problem

In order to solve the above-described problems and achieve the above-described object, according to an aspect of the present invention, a distributed antenna includes:

a strip member extending in a strip-like shape including a dielectric body of a plate shape having a first surface that is one surface of the dielectric body and a second surface that is opposite to the first surface;

a transmission line provided on the first surface, on the second surface, or between the first surface and the second surface; and a plurality of antenna elements electrically connected to the transmission line and disposed in a distributed manner on the first surface or on the second surface, or electrically connected to the transmission line and disposed in a distributed manner between the first surface and the second surface.

Effects of the Invention

According to an embodiment of the present disclosure, a distributed antenna that is easy to be installed is provided.

BRIEF DESCRIPTION OF DRAWINGS

Other objects and further features of the present disclosure will be apparent from the following detailed description when read in conjunction with the accompanying drawings, in which:

FIG. 36 is a diagram depicting an example of an antenna pattern in a flexible antenna according to a third variation of the embodiment;

MODE FOR CARRYING OUT THE INVENTION

In the following, a distributed antenna according to an embodiment of the present disclosure will be described in detail with reference to drawings. Hereinafter, embodiments according to the present disclosure will be described with reference to the drawings.

Figure 1:
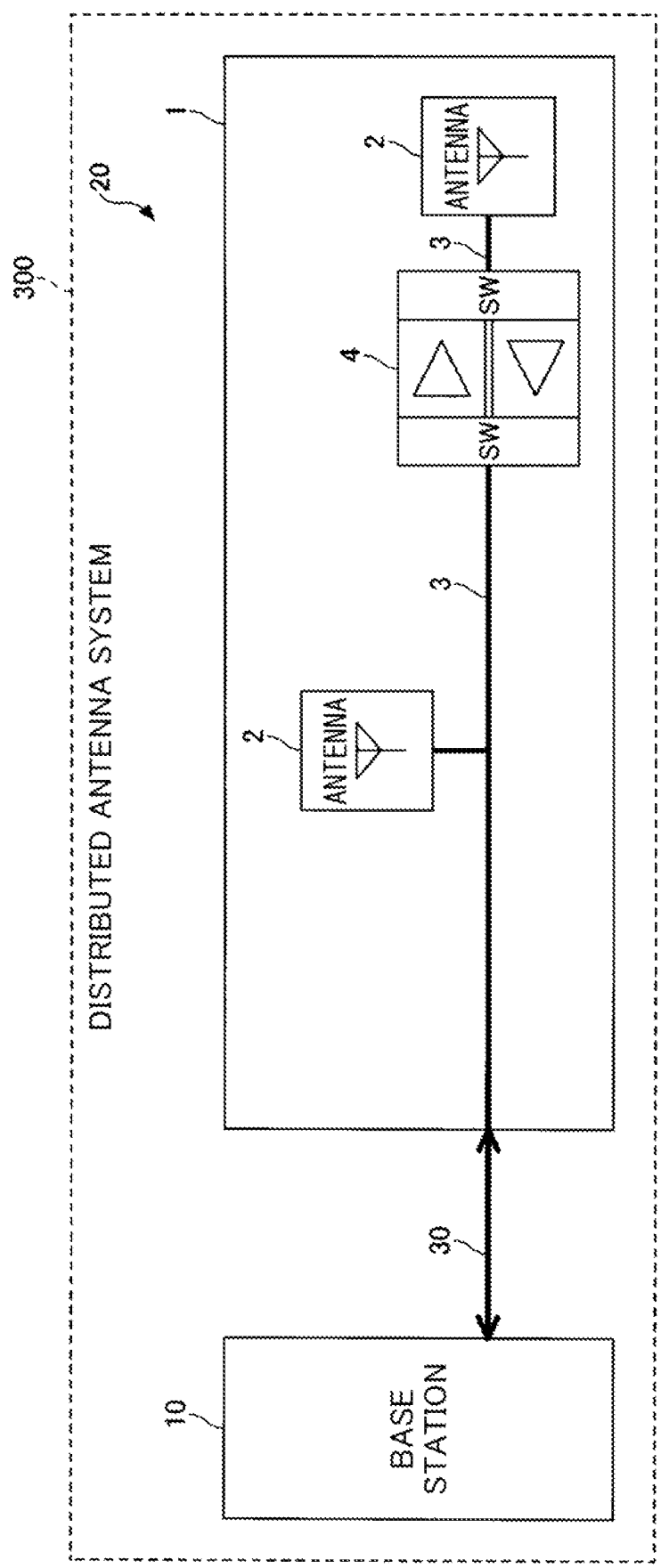
FIG. 1 is a diagram depicting an example of a configuration of a distributed antenna and a base station according to an embodiment of the present application.

FIG. 1 is a diagram depicting an example of a configuration of a distributed antenna and a base station according to the embodiment of the present disclosure. The distributed antenna system 300 shown in FIG. 1 includes a base station 10, a distributed antenna 20, and a communication line 30. To the distributed antenna 20, for example, the base station 10 is connected via the communication line 30. The distributed antenna 20 is an antenna for a base station of 5G, for example.

The distributed antenna 20 includes a strip member 1 which is a strip-shaped dielectric body; and a plurality of antenna elements 2 disposed in a distributed manner on the strip member 1. The distributed antenna 20 further includes a transmission line 3, which is a line for transmitting signals disposed in the strip member 1, connected to the communication line 30, and coupling the plurality of antenna elements 2; and a signal processing circuit 4 for processing signals transmitted between the antenna elements 2 and the base station 10. The transmission line 3 may include, for example, a substrate integrated waveguide (SIW), or a strip line in a multilayer substrate. In this case, the transmission line 3 is provided between a first surface and a second surface of the strip member 1. Details of the first surface and the second surface of the strip member 1 will be described later. The transmission line 3 may be provided on either the first surface or the second surface (e.g., a microstrip line).

The strip member 1 is, for example, a flexible substrate having a strip-shaped dielectric body as a core material. The flexible substrate has flexibility with properties that the substrate can be bent, be repeatedly deformed with a weak force, and retain an electrical property even when the substrate is deformed. The flexible substrate is thinner than a typical rigid substrate and has superior workability, allowing complex shape machining. The flexible substrate has, for example, a structure in which a conductive foil is bonded to a thin film-like dielectric body having a thickness of from 12 µm to 500 µm. The dielectric body is made of a material called solder resist (resist/photoresist) or coverlay, and polyimide, polyester, or the like is used. Also, if the dielectric body includes a resin layer (i.e., a part of or the entirety of the dielectric body is a resin layer), the resin layer may include a fluoropolymer such as a tetrafluoroethylene-based polymer. Examples of materials of the conductive foil include gold, silver, copper, aluminum, platinum, and chromium. The strip member 1 may be composed of a rigid substrate having a strip-shaped dielectric body as a core material instead of the flexible substrate. Examples of the rigid substrate include a glass composite substrate, a glass epoxy substrate, an alumina substrate, and a composite substrate. The strip member 1 may be a stack of a plurality of dielectric layers. In this case, the plurality of antenna elements 2 are electrically connected to the transmission line and are provided between the first and second surfaces of the strip member 1. That is, the antenna elements 2 may be embedded in the multilayer substrate. Alternatively, the plurality of antenna elements 2 may be provided on the first surface or the second surface.

The antenna element 2 is suitable for transmitting and receiving radio waves in a high frequency band such as microwaves or millimeter waves (e.g., with the frequency greater than 1 GHz and less than or equal to 300 GHz). The antenna element 2 may be applied to, for example, a V2X (vehicle to X) communication system, a fifth generation mobile communication system (so-called 5G), or an on-board radar system, but the applicable system is not limited thereto. The frequency range may be, for example, for Intelligent Transport Systems (ITS) (5.89 GHz), 5G (28 GHz band, 3.6 to 6 GHz band, and 39 GHz band), or Wi-Fi (2.4 GHz, and 5 GHz).

Next, an example of disposing the antenna elements 2 or the like on the strip member 1 will be described with reference to FIGS. 2 to 4.

Figure 2:
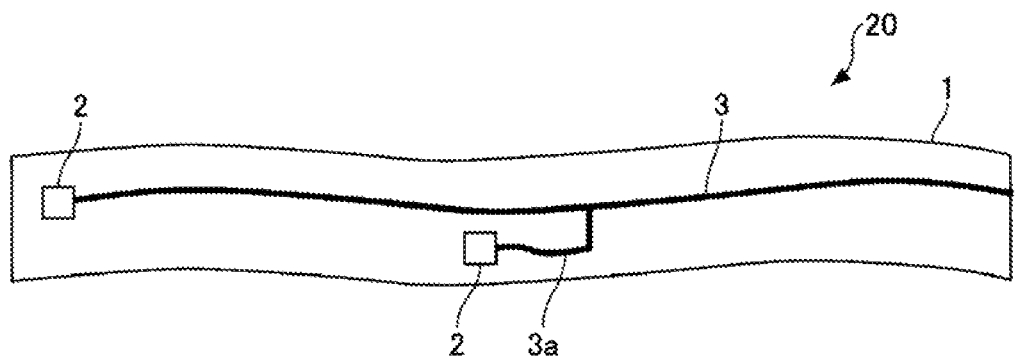
FIG. 2 is a diagram depicting an example of disposing a plurality of antenna elements connected to a transmission line by branching.

FIG. 2 is a diagram depicting an example of disposing the plurality of antenna elements connected to the transmission line by branching. A strip member 1 shown in FIG. 2 is provided with a transmission line 3 as a first transmission line, an antenna element 2 disposed on the transmission line 3 (for example, at an end of the transmission line 3), a transmission line 3*a* which is one or more second transmission lines branching from the transmission line 3, and an antenna element 2 disposed on the transmission line 3*a* (for example, at an end of the transmission line 3*a*). As described above, disposing the antenna elements 2 on the plurality of transmission lines 3*a* branched from one transmission line 3 is referred to as a "branch connection type." The configuration of "branching from transmission line 3" includes a simple branch (impedance matched), a branch by using a synthesizer or a distributor such as a Wilkinson coupler, and the like.

According to the branch connection type, since the plurality of antenna elements 2 can be disposed around the transmission line 3 that is linearly wired on the strip member 1, a degree of freedom of a layout of the arrangement of the antenna elements 2 is improved. Therefore, for example, a width of the strip member 1 in a direction perpendicular to the extension direction of the strip member 1 is increased, and the plurality of antenna elements 2 can be disposed in a plane shape by using the extended portion. Accordingly, the branch connection type is particularly useful in widening the coverage area in a plane shape.

Figure 3:
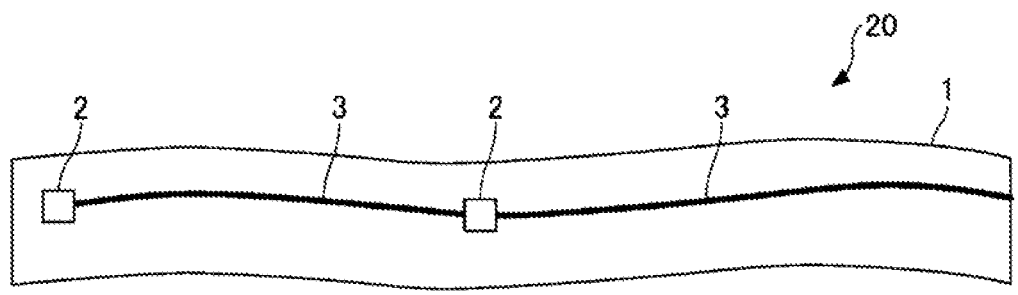
FIG. 3 is a diagram depicting an example of disposing antenna elements 2 connected to the transmission line by cascading.

FIG. 3 is a diagram depicting an example of disposing antenna elements 2 connected to the transmission line by cascading. A strip member 1 shown in FIG. 3 is provided with a transmission line 3 and two antenna elements 2 disposed on the transmission line 3 (for example, at an end and a point other than the end of the transmission line 3). As described above, disposing the plurality of antenna elements 2 on one transmission line 3 is referred to as a "cascade connected type."

According to the cascade connection type, the structure of the transmission line 3 can be simplified and the width of the strip member 1 in the direction perpendicular to the extension direction of the transmission line 3 can be narrowed. Accordingly, it is particularly useful in expanding the coverage area linearly without making a user of a portable terminal or the like conscious of the distributed antenna 20.

Figure 4:
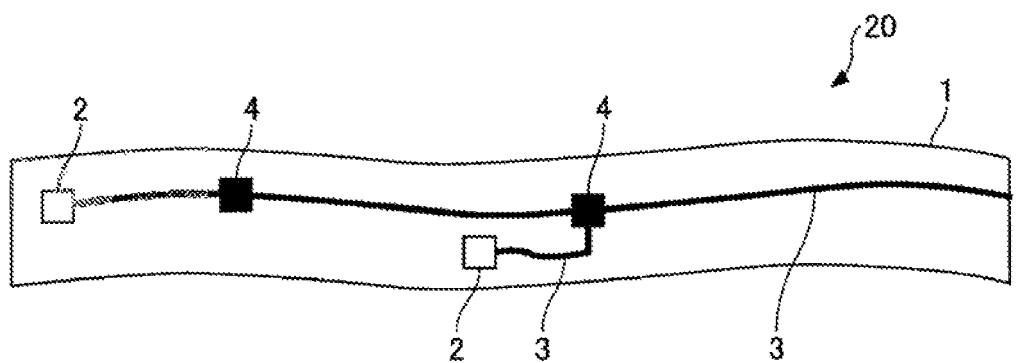
FIG. 4 is a diagram depicting an example of a configuration of a signal processing circuit disposed on the transmission line.

FIG. 4 is a diagram depicting an example of a configuration of a signal processing circuit disposed on the transmission line. In the strip member 1 shown in FIG. 4, a transmission line 3, an antenna element 2 disposed on the transmission line 3 (for example, an end of the transmission line 3), a transmission line 3*a* branching from the transmission line 3, an antenna element 2 disposed on the transmission line 3*a* (for example, an end of the transmission line 3*a*), and a signal processing circuit 4 disposed on the transmission line 3, for example, are provided.

In FIG. 4, one of the two signal processing circuits 4 is provided on the transmission line 3 and the other is disposed at a point where the transmission line 3*a* branches from the transmission line 3. The position of disposing the signal processing circuit 4 is not limited to the position shown in the drawings. For example, an intermediate portion of the transmission line 3*a*, a vicinity of the transmission line 3, a vicinity of the transmission line 3*a*, or the like may be used. Further, the number of the signal processing circuits 4 is not limited to two, and the number can be appropriately changed depending on the application, the specification, or the like of the distributed antenna 20.

FIG. 4 illustrates a plurality of antenna elements 2 connected by branching. Then, by providing a signal processing circuit 4 having, for example, an amplifier (AMP), a switch, a mixer, a digital to analog converter (DAC), an analog to digital converter (ADC), or the like, near the antenna elements 2, it is possible to compensate for millimeter waves or the like in which a signal transmission loss is large. The same effect can be obtained when the signal processing circuit 4, having any of (or a part of) the AMP, the switch, the mixer, the DAC, or the ADC, is provided near the antenna element 2. Details of the AMP, the switch, the mixer, the DAC, the ADC, and the like will be described later.

Figure 5:
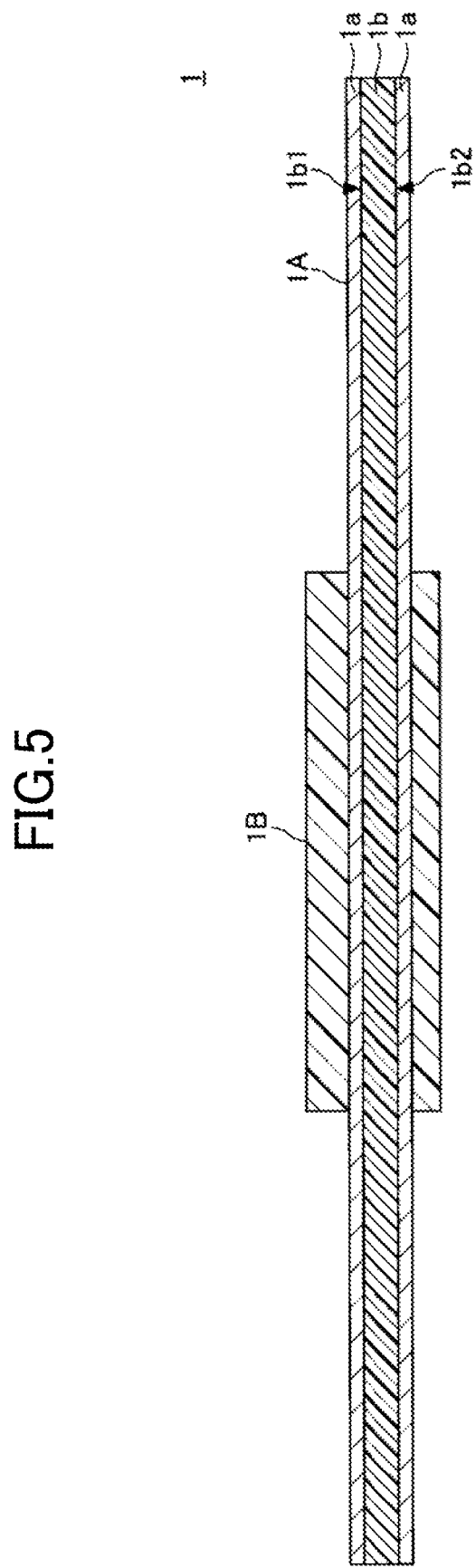
FIG. 5 is a diagram depicting an example of a configuration of a strip member in which a rigid portion 1B is fixed to (laminated on) a flexible portion 1A.
Figure 6:
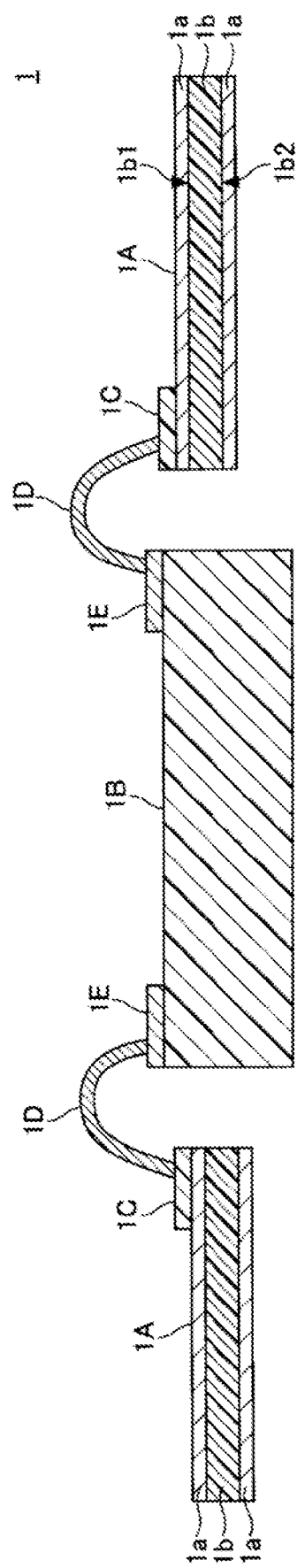
FIG. 6 is a diagram depicting an example of a configuration of the strip member 1 in which the flexible portion 1A and the rigid portion 1B that is provided at a position separate from the flexible portion 1A are connected with a connector 1C.

Referring to FIGS. 5 and 6, a configuration example of the strip member 1 in which a flexible core member (flexible member) and a rigid core member are combined will be described.

FIG. 5 is a diagram illustrating an example of a configuration of the strip member 1 in which a rigid portion 1B is fixed (laminated) to a flexible portion 1A, and FIG. 6 is a diagram illustrating an example of a configuration of the strip member 1 in which the flexible portion 1A and the rigid portion 1B that is provided at a position separate from the flexible portion 1A are connected with a connector 1C, or the like. The flexible portion 1A includes, for example, a core portion 1*b*, which is a plate-like dielectric layer, and conductive portions 1*a*, which are electrically conductive members (for example, copper foils) disposed on an upper surface and a lower surface of the core portion 1*b*. One of the two conductive portions 1a is provided on a first surface 1b1 which is a surface of the core portion 1b, and the other conductive portion 1a is provided on a second surface 1b2 which is opposite to the first surface 1b1 of the core portion 1b. A transmission line 3 is provided on any of the first surface 1b1 or the second surface 1b2, or is provided between the first surface 1b1 and the second surface 1b2. Further, the antenna elements 2 are electrically connected to the transmission line 3 and are disposed in a distributed manner on any surface of the first surface 1b1 or the second surface 1b2. The flexible portion 1A is not limited thereto, and may be formed by laminating, for example, two or more dielectric layers and two or more conductive members.

The strip members 1 are, for example, composed of rigid flexible substrates, which are substrates having the advantages of both rigid substrates and flexible substrates, such that a component can be easily mounted and a three-dimensional configuration can be easily obtained by bending the substrate. The rigid flexible substrate includes a rigid portion 1B, which is a rigid core member mounting a component, and a flexible portion 1A, which is a flexible member (a flexible core member) having flexibility.

The strip member 1 shown in FIG. 5 has a structure in which the rigid portion 1B is laminated with the flexible portion 1A. In this case, the rigid portion 1B preferably has a size such that the rigid portion 1B does not interfere with the flexibility of the flexible portion 1A.

The strip member 1 shown in FIG. 6 has a structure, for example, that the rigid portion 1B is provided between two separated flexible portions 1A, and the flexible portions 1A and the rigid portion 1B are electrically connected to each other using the connector 1C and a jumper wire 1D. The jumper wire 1D may be a part of the flexible portion 1A.

Figure 7:
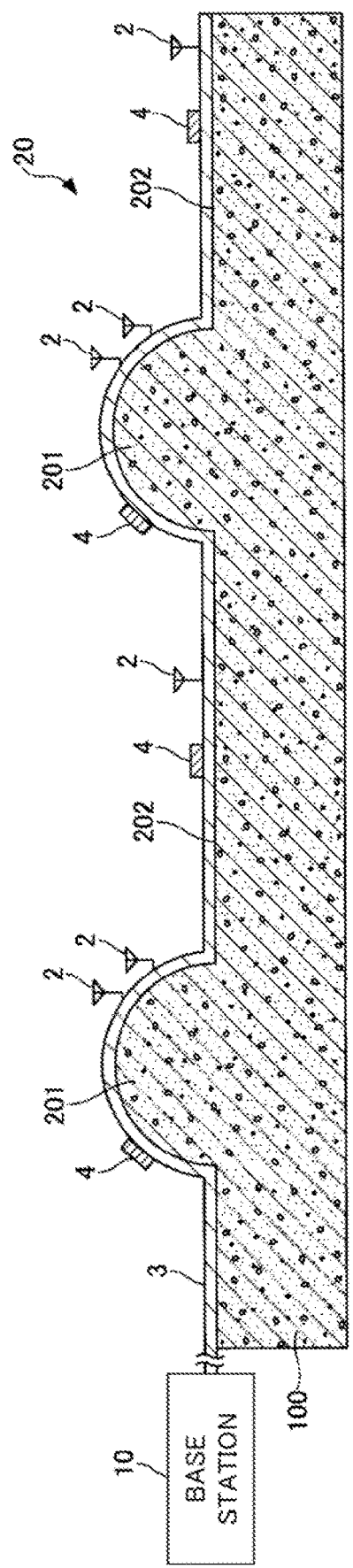
FIG. 7 is a diagram illustrating an example of disposing the plurality of antenna elements in a distributed manner.

Next, an example of disposing a plurality of antenna elements 2 in a distributed manner will be described with reference to FIG. 7. FIG. 7 is a diagram illustrating an example of disposing the plurality of antenna elements in a distributed manner. FIG. 7 shows a cross-section of a wall 100 of a building and a distributed antenna 20 provided on a surface of the wall 100 of the building. If the distributed antenna 20 includes a strip member 1 having flexibility, even when a convex portion 201 is present on the surface of the wall 100 of the building 10, the strip member 1 can be provided along the surface of the convex portion 201. Also, the distributed antenna 20 may be provided at a boundary between a region of the surface of the wall 100 that is not provided with the convex portion 201 (flat surface 202) and the convex portion 201 while minimizing a gap.

For example, an adhesive may be used to fix the distributed antenna 20 to the wall 100, or a fastener, such as a bolt or nut, may be used. The distributed antenna 20 may also be provided on the wall 100 by hooking the distributed antenna 20 onto a hook-shaped member projecting from the wall 100. Thus, the distributed antenna 20 can be easily provided, and, for example, the distributed antenna 20 can be provided on the wall 100 of the building only during an irregular event, and the distributed antenna can be easily detached after the end of the event. Accordingly, the distributed antenna 20 can be utilized on demand, without constantly providing the distributed antenna 20. In the case of the conventional distributed antenna, when the distributed antennas are installed in an event venue or the like, the antennas must be individually provided on a wall or the like with a complicated work, and a transmission line to be connected to the antenna must be separately provided. Therefore, for using radio waves in the millimeter-wave band, it takes a great deal of workload to expand the coverage area, and it also takes a lot of time to remove the antennas after the event. On the other hand, according to the distributed antenna 20 of the present embodiment, since a plurality of antenna elements 2, a transmission line 3, and the like are provided on a strip-shaped dielectric body, only by mounting the strip member 1 to the wall 100 of the building or the like and connecting the antenna to the base station 10, the coverage area can be easily expanded. In addition, since the antenna can be collected by simply removing the strip members 1, a restoration work after the event is easily performed.

Figure 8:
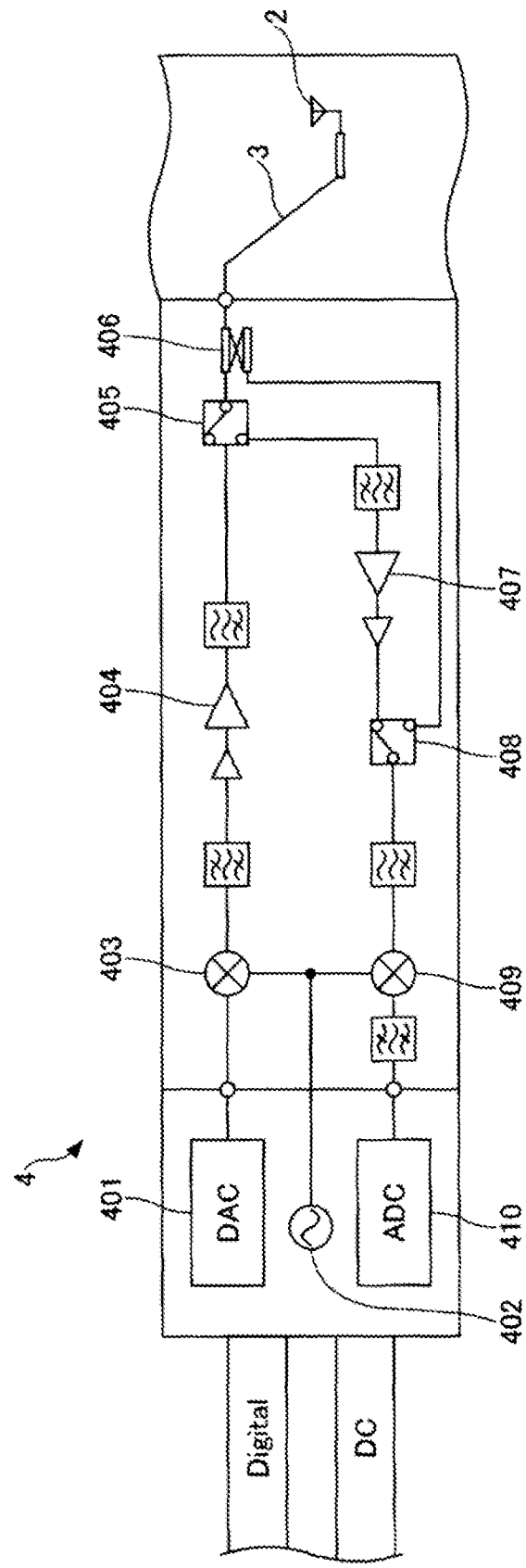
FIG. 8 is a diagram depicting an example of a configuration of the signal processing circuit.

Next, an example of a configuration of the signal processing circuit 4 will be described with reference to FIGS. 8 and 9. FIG. 8 is a diagram illustrating an example of a configuration of the signal processing circuit 4. The term "Digital" in the drawing means the transmission line for digital signals. The term "DC" means, for example, a wiring that provides DC power. The signal processing circuit 4 includes a DAC 401, which is a converter that converts a digital signal transmitted, for example, from the base station 10 into an analog signal and outputs it to a mixer 403; a local transmitter 402, which is a local signal source; and the mixer 403, which is an up-converter that up-converts a signal from the DAC 401 by a local signal from the local transmitter 402. The signal processing circuit 4 further includes a power amplifier 404, which is a signal amplifier that amplifies a signal output from the mixer 403 and inputs the signal to the antenna element 2 via a switch 405 and a directional coupler 406; the switch 405, which is means for selecting transmission or reception of the signal processing circuit 4; and the directional coupler 406. The signal processing circuit 4 further includes a low noise amplifier 407 for amplifying a signal received by the antenna element 2 and inputting the signal through a switch 408 to a mixer 409; and the switch 408, which is means for selecting a path for monitoring and feeding back a received/transmitted signal, and selecting whether to receive a communication signal. The signal processing circuit 4 further includes the mixer 409, which is a down-converter for down-converting a signal from the low noise amplifier 407; and an ADC 410, which is a converter for converting an analog signal transmitted from the mixer 409 into a digital signal and transmitting the signal, for example, to the base station 10.

According to the signal processing circuit 4, by being provided with the DAC 401 and the ADC 410, communication by digital signals between the base station 10 and the signal processing circuit 4 becomes possible, and thus deterioration of signals is suppressed. Accordingly, the communicable distance from the base station 10 to the signal processing circuit 4 can be made relatively longer, and a plurality of antenna elements 2 can be disposed in a distributed manner at remote locations from the base station 10.

Moreover, according to the signal processing circuit 4, for example, by being provided with the mixer 403 and the mixer 409, the signal transmitted between the base station 10 and the signal processing circuit 4 can be handled at a low frequency, thereby reducing a transmission loss between the base station 10 and the signal processing circuit 4. Accordingly, the communicable distance from the base station 10 to the signal processing circuit 4 can be made relatively longer, and a plurality of antenna elements 2 can be disposed in a distributed manner at remote locations from the base station 10.

In this manner, by combining the DAC 401 and the ADC 410 with the mixer 403 and the mixer 409, signals can be transmitted to a distributed antenna 20 laid on an audience seat in a stadium by, for example, routing a communication line 30 from the base station 10 to the audience seat in the stadium for about tens of meters to hundreds of meters in a state where the base station 10 is provided in an equipment room of the stadium. As a result, wireless communication over millimeter waves, for example, with a plurality of portable terminals present in the audience seat is possible. In addition, even when a plurality of portable terminals exists in the audience seat in a stadium or the like, for example, within a range of several tens of meters, by using the signal processing circuit 4 for compensating for radio communication levels in such a wide range, wireless communication becomes possible thereby.

The signal processing circuit 4 includes the mixer 403, the mixer 409, the DAC 401, and the ADC 410. However, the signal processing circuit 4 may include only the mixer 403 and the mixer 409, or may include only the DAC 401 and the ADC 410. Even in this case, the effect that the communicable distance from the base station 10 to the signal processing circuit 4 can be made longer, and the configuration of the signal processing circuit 4 can be simplified to enhance the reliability is obtained.

Next, an example in which a plurality of signal processing circuits 4 are provided on one strip member 1 will be described with reference to FIGS. 9 and 10 and the like.

Figure 9:
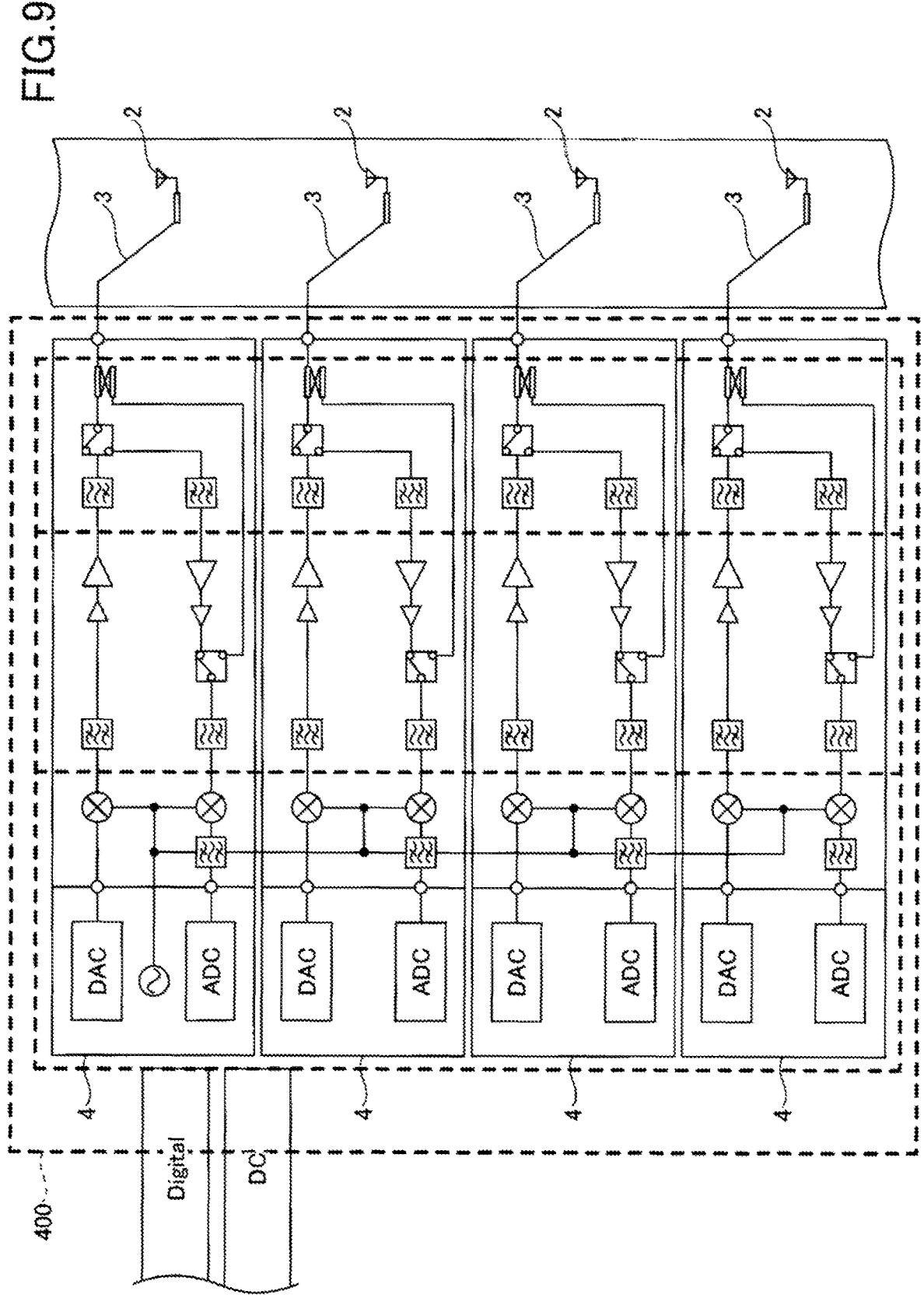
FIG. 9 is a diagram illustrating an example of connecting an amplifier module provided with a plurality of signal processing circuits and a plurality of antenna elements connected to the amplifier module.

FIG. 9 is a diagram illustrating an example of a connection between an amplifier module provided with a plurality of signal processing circuits and a plurality of antenna elements connected to the amplifier module. The amplifier module 400 shown in FIG. 9 includes, for example, four signal processing circuits 4, each of which is connected to an antenna element 2 via a transmission line 3. The number of signal processing circuits 4 provided by the amplifier module 400 is not limited to four. In addition, when the number of signal processing circuits 4 of the amplifier module 400 is two or more, the amplifier module 400 can be realized by arranging the signal processing circuits 4 in parallel as shown in FIG. 9. In FIG. 9, a module provided with a plurality of signal processing circuits 4 is referred to as an amplifier module 400, but the signal processing circuit 4 itself may be read as an amplifier module 400. Accordingly, one signal processing circuit 4 may be referred to as an amplifier module 400.

Figure 10:
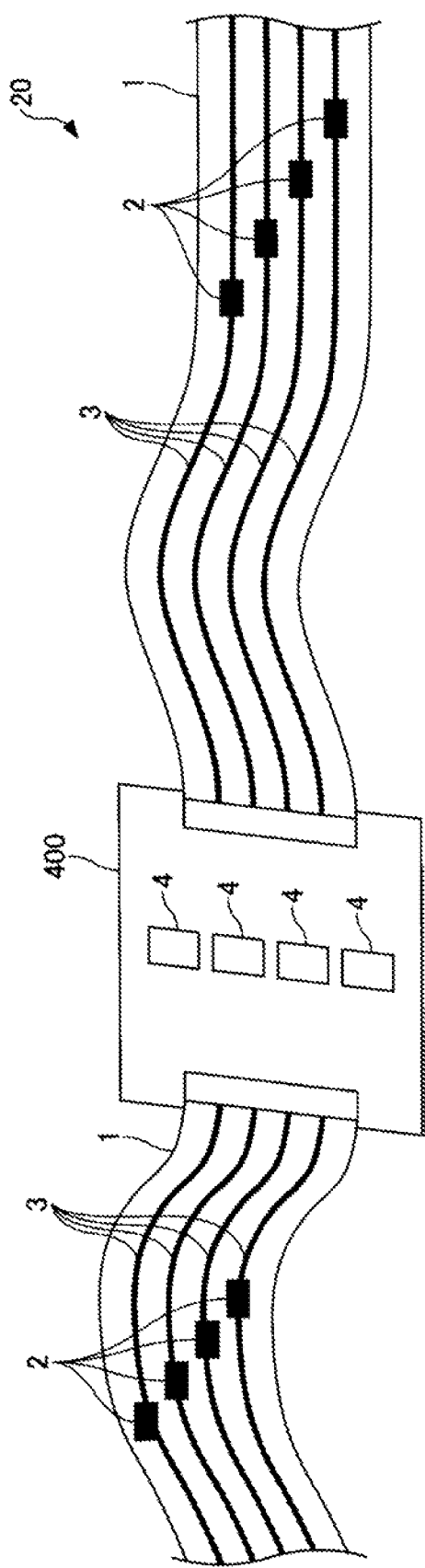
FIG. 10 is a diagram illustrating an example of providing the amplifier module on the strip member.

FIG. 10 is a diagram illustrating an example of providing an amplifier module in a strip member. By providing the amplifier module 400 in the strip member 1, the low noise amplifier 407 and the power amplifier 404 of the signal processing circuit 4 compensate for a transmission loss of a signal through the transmission line 3. Therefore, distances from the amplifier module 400 to the plurality of antenna elements 2 can be significantly extended. The amplifier module 400 shown in FIG. 10 may be configured to include, in particular, the low noise amplifier 407, the power amplifier 404, the switch 405, the directional coupler 406, and the like among the functions of the signal processing circuit 4.

When the amplifier module 400 is provided at a location other than the strip member 1, work for connecting the amplifier module 400 to the antenna element 2 is required. However, according to the example of configuration shown in FIG. 10, the work is unnecessary, and work for installing the distributed antenna 20 is facilitated. In addition, since an erroneous connection of wiring by an operator does not occur, deterioration of the communication quality can be suppressed. Further, according to the configuration example shown in FIG. 10, for example, since the low-noise amplifier 407 can be provided near the antenna element 2, deterioration of a signal due to a transmission loss from the antenna element 2 to the low-noise amplifier 407 can be suppressed.

In addition, compared with the case where the amplifier module 400 is provided at a place other than the strip member 1, design of the distributed antenna 20 is improved. Furthermore, usable locations of the distributed antenna 20 can be increased without impairing design of a building or the like.

Further, since the amplifier module 400 is disposed in the strip member 1, heat generated by the low noise amplifier 407, the power amplifier 404, or the like is transmitted to the transmission line 3 and the strip member 1, and the transmission line 3 and the strip member 1 function as a heat radiator. Accordingly, a failure of the amplifier module 400 due to heat can be prevented. Further, by providing the amplifier module 400 in the strip member 1, even when, for example, a heat radiating member (such as a fin) is provided at an inconspicuous position on the wall surface, the transmission line 3 and the strip member 1 can be used as a heat conduction path for transferring heat generated by the power amplifier 404 or the like to the heat radiating member.

The strip member 1 may be provided with power wiring (for example, wiring for supplying direct current (DC) power) for supplying power for driving the amplifier module 400 or the signal processing circuit 4. Therefore, it becomes unnecessary to install power wiring separately from the strip member 1, and work time can be significantly reduced even when the distributed antennas 20 are installed in a wide area while suppressing deterioration in the appearance of the distributed antennas 20.

Figure 11:
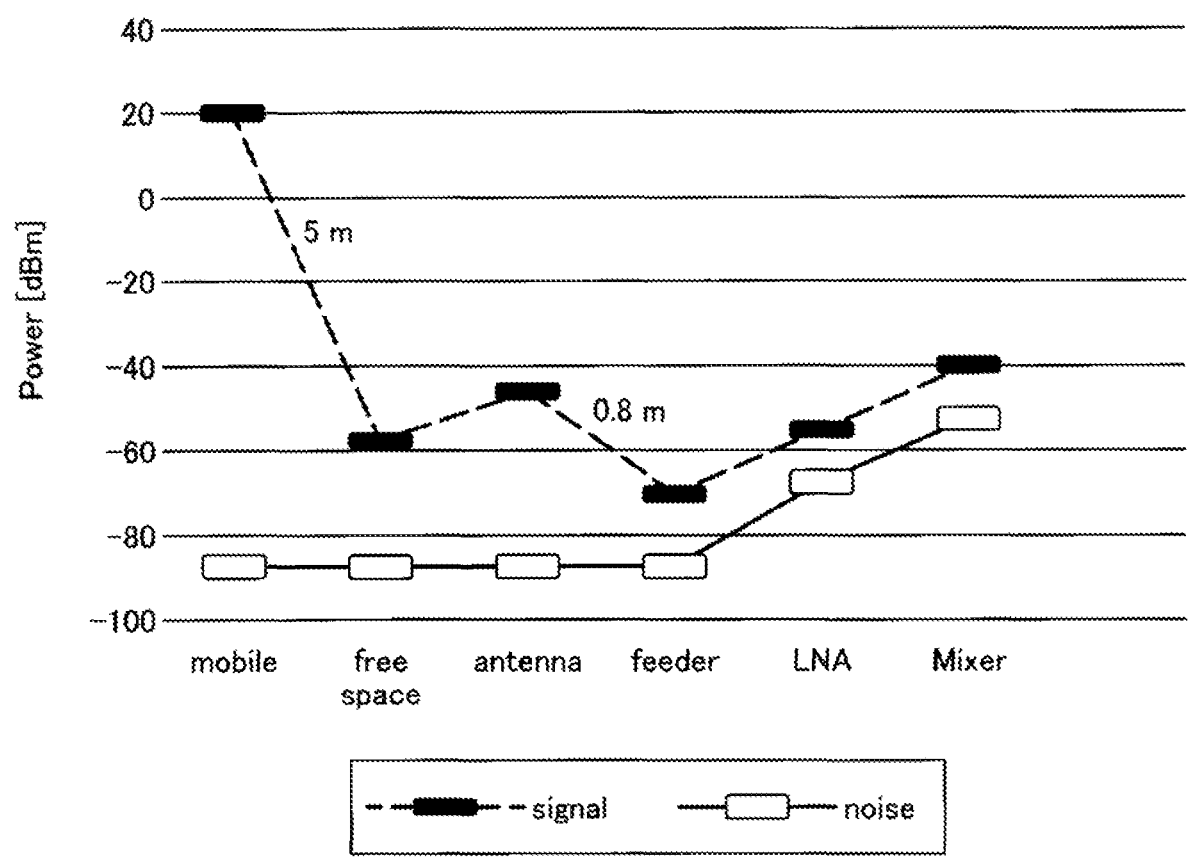
FIG. 11 is a diagram illustrating an example of a communicable distance in a case where a low noise amplifier is not provided.
Figure 12:
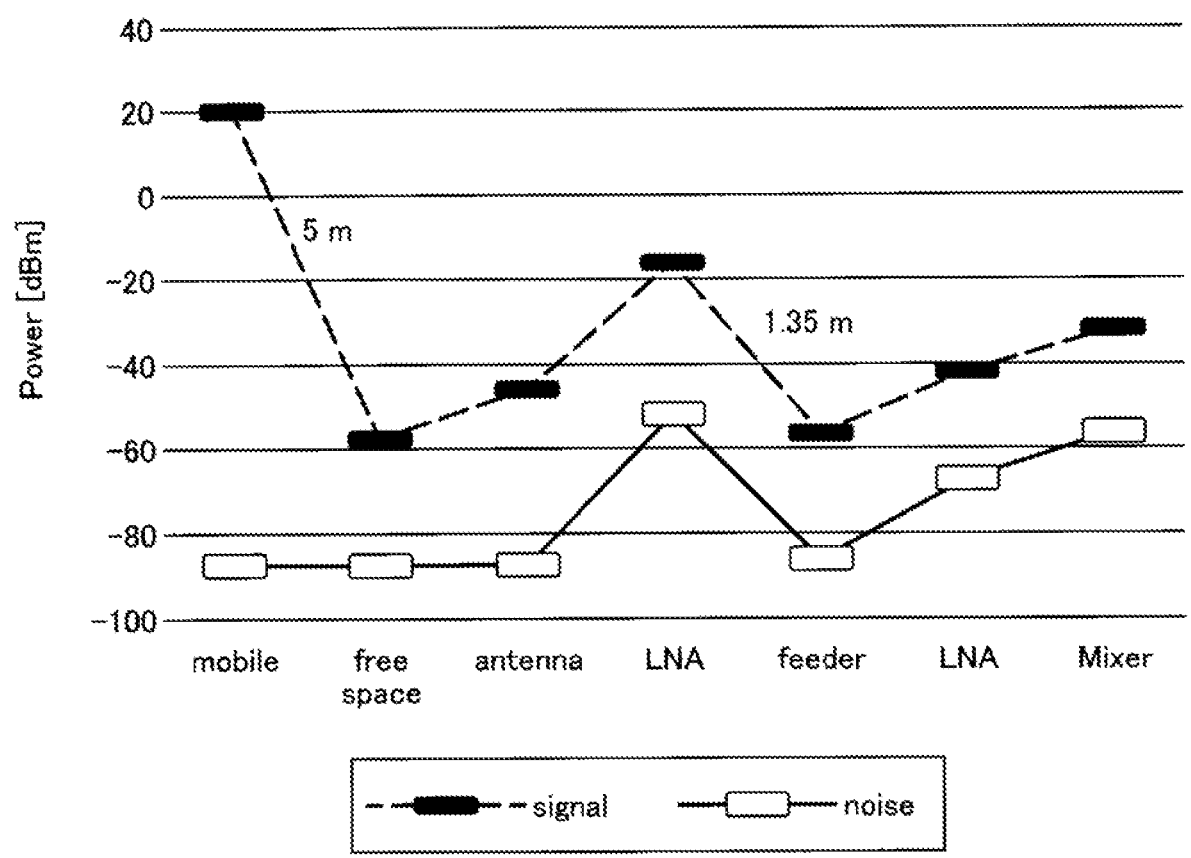
FIG. 12 is a diagram illustrating an example of the communicable distance in a case where the low noise amplifier is provided.
Figure 13:
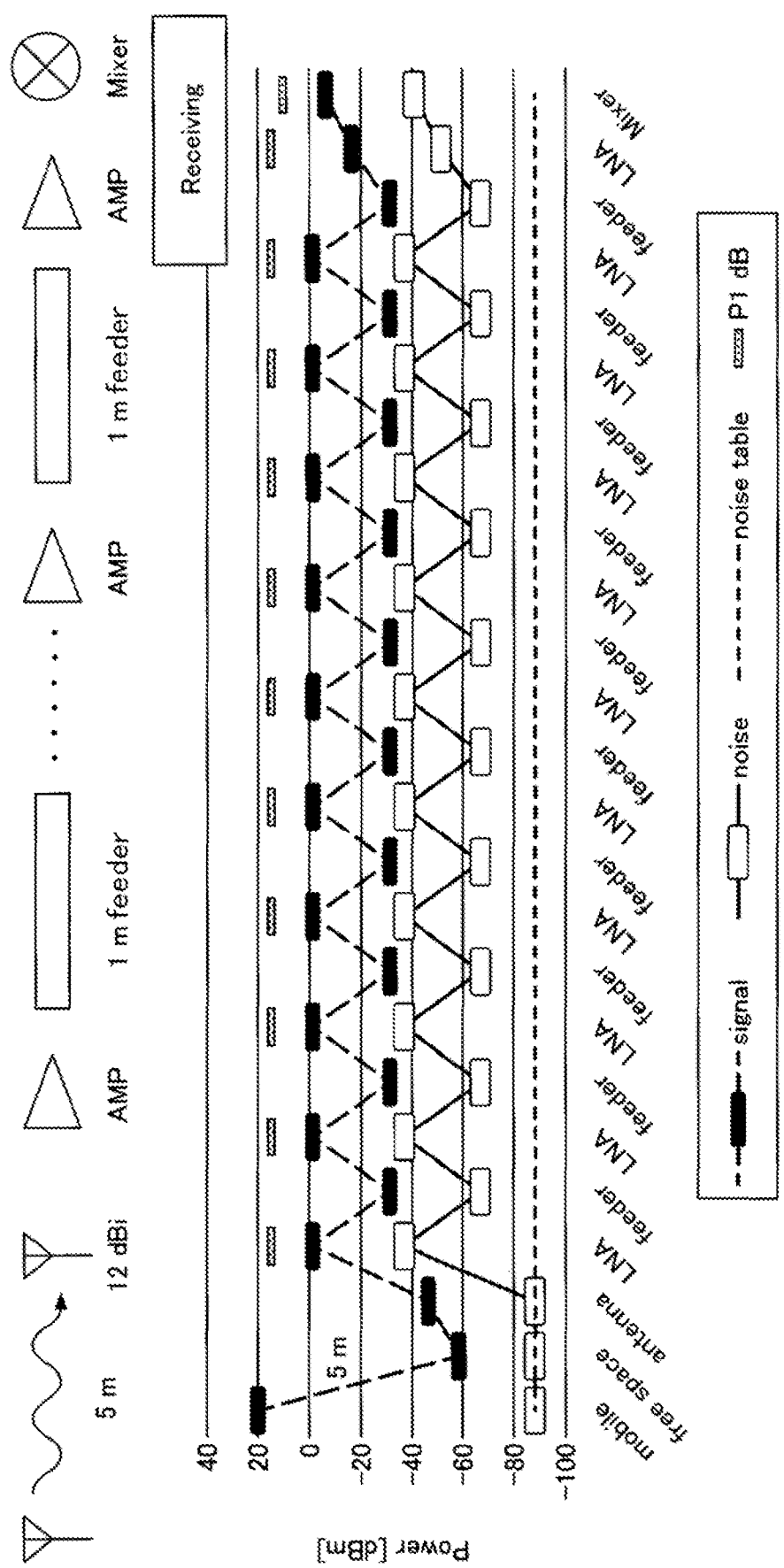
FIG. 13 is a diagram depicting an example of a configuration in which the communicable distance is increased by providing a plurality of low-noise amplifiers.

FIG. 11 is a diagram for explaining a communicable distance when a low noise amplifier is not provided. FIG. 12 is a diagram for explaining a communicable distance when a low noise amplifier is provided. FIG. 13 is a diagram illustrating an example of a configuration in which a communicable distance is increased by providing a plurality of low-noise amplifiers. The horizontal axes in FIGS. 11, 12 and 13 represent distances from the portable terminal, and the vertical axes of FIGS. 11, 12 and 13 represent powers output from devices. Dashed lines represent levels of signals and solid lines represent levels of noises. The conditions for acquiring data are as follows:

(Conditions)
 LNA in FIGS. 11 and 12: Gain=15 dB/NF=4 dB;
 LNA in the first stage in FIG. 13: Gain=45 dB/NF=6 dB;
 LNA in the second and subsequent stages in FIG. 13: Gain=30 dB/NF=5 dB;
 Mobile Power: 20 dBm;
 Antenna Gain: 12 dBi;
 Distance to Tx: 5 m;
 Feeder loss: 30 dB/m;
 Mixer: Gain=10 dB/NF=15 dB; and
 SN ratio after Mixer: 10 dB As shown in FIG. 11, in the case where the low noise amplifier 407 is not provided, the signal level is low, and when the distance from the portable terminal to the antenna element 2 is 5 m, the transmission distance from the antenna element 2, as the reception system, to the mixer 409 can be secured only about 0.8 m. The same applies to the transmission system. On the other hand, in the case where the low noise amplifier 407 is provided, the signal level is high, as shown in FIG. 12, and when the distance from the portable terminal to the antenna element 2 is 5 m, the transmission distance from the antenna element 2, as the reception system, to the mixer 409 can be secured about 1.35 m. The same applies to the transmission system, so that the transmission distance from the mixer 403 to the antenna element 2 can be extended. Furthermore, as shown in FIG. 13, the communicable distance can be extended by providing a plurality of low-noise amplifiers. The signal processing circuit 4 may include only the low-noise amplifier 407 or may include only the low-noise amplifier 407 and the power amplifier 404. Moreover, the transmission distance may be further secured by using a low-loss device, such as a waveguide or an optical fiber via an optical-electric converter, for the communication circuit 30. In the case of only providing the low noise amplifier 407 and the power amplifier 404, the communicable distance can be further extended by using a low-loss device for the communication circuit, and it is preferable.

Next, an example of disposing the antenna elements of the branch connection type and an example of disposing the antenna elements of the cascade connection type will be described with reference to FIGS. 14 to 18.

Figure 14:
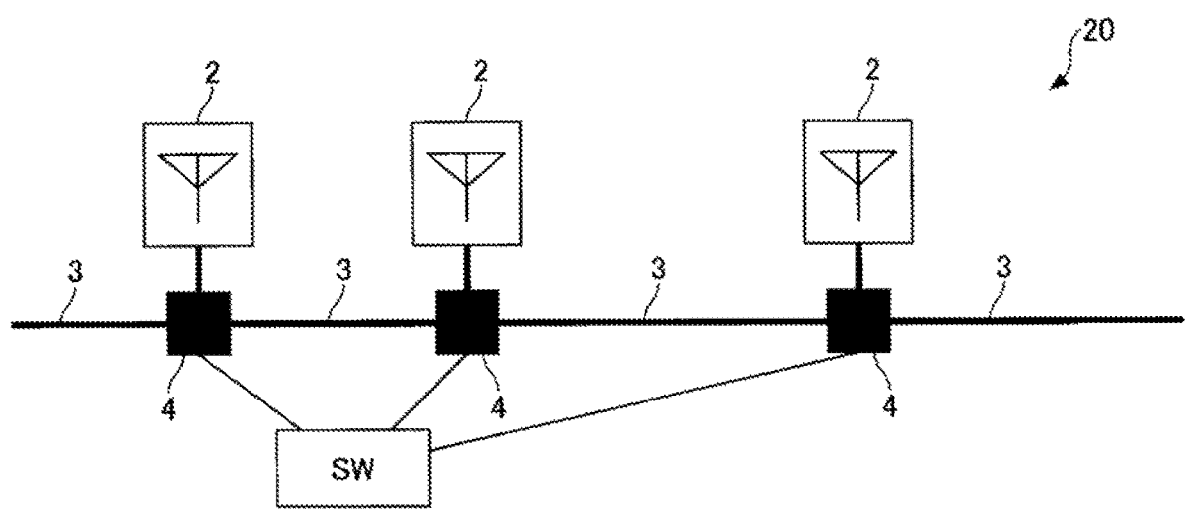
FIG. 14 is a diagram schematically illustrating a distributed antenna of a branch connection type.

FIG. 14 is a diagram schematically illustrating an example of a distributed antenna of the branch connection type. The distributed antenna of the branch connection type 20 has an advantage that communication efficiency is high because it is possible to select the optimum antenna element 2 by using a switch function of the signal processing circuit 4, to communicate with a nearby portable terminal. When a synthesizer or a distributor such as a Wilkinson coupler is used, the optimum antenna element 2 cannot be selected, but the configuration can be simplified.

Figure 15:
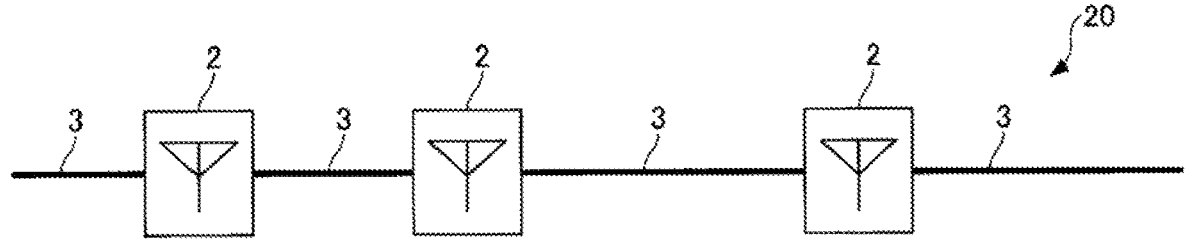
FIG. 15 is a diagram schematically illustrating a distributed antenna of a cascade connection type.

FIG. 15 is a diagram schematically illustrating an example of a distributed antenna of a cascade connection type. Since the distributed antenna of the cascade connection type 20 can communicate with a nearby portable terminal without using the switch function of the signal processing circuit 4, the distributed antenna of the cascade connection type has an advantage of a simple configuration and high reliability.

Figure 16:
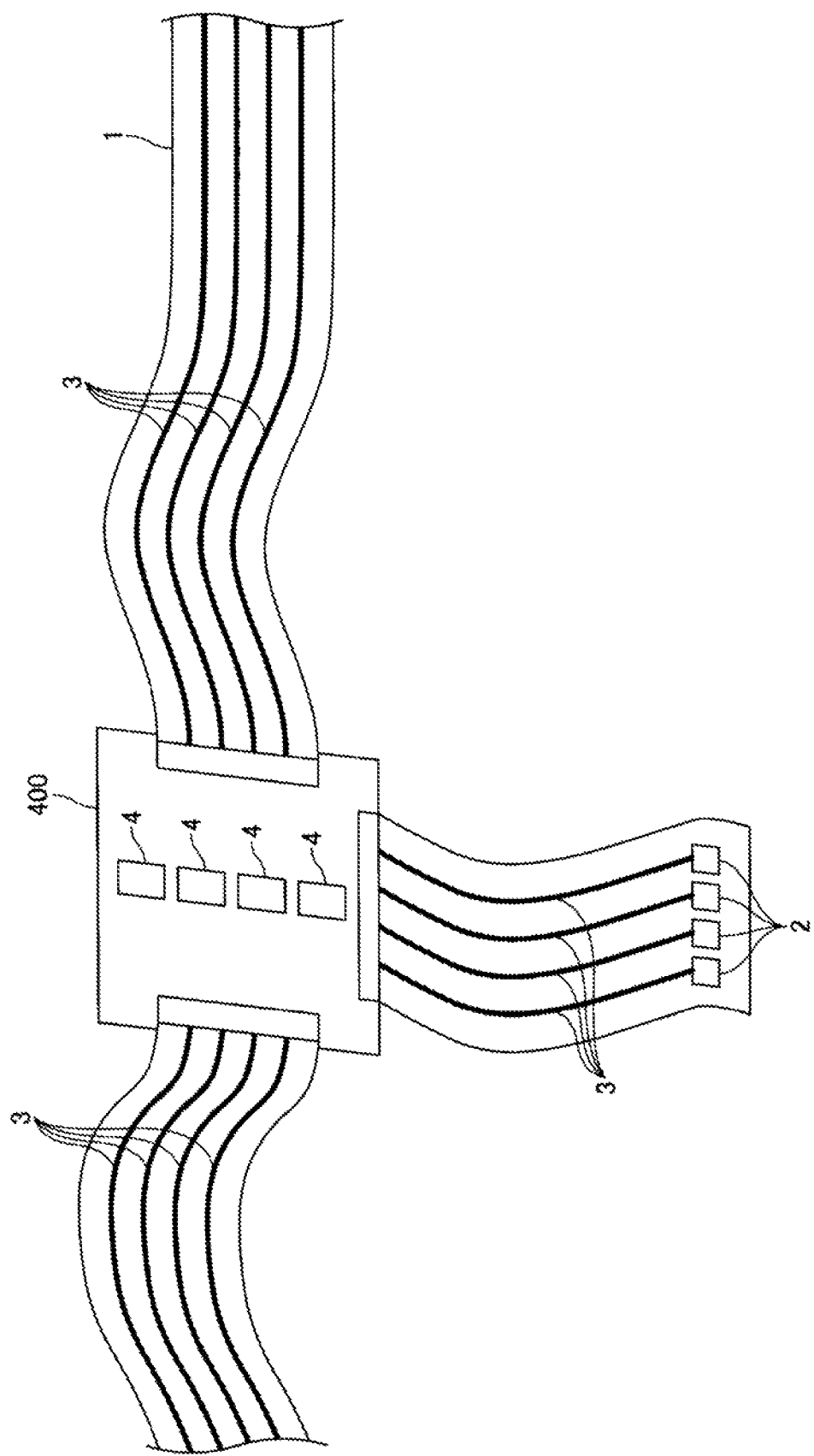
FIG. 16 is an enlarged view of the distributed antenna of the branch connection type.
Figure 17:
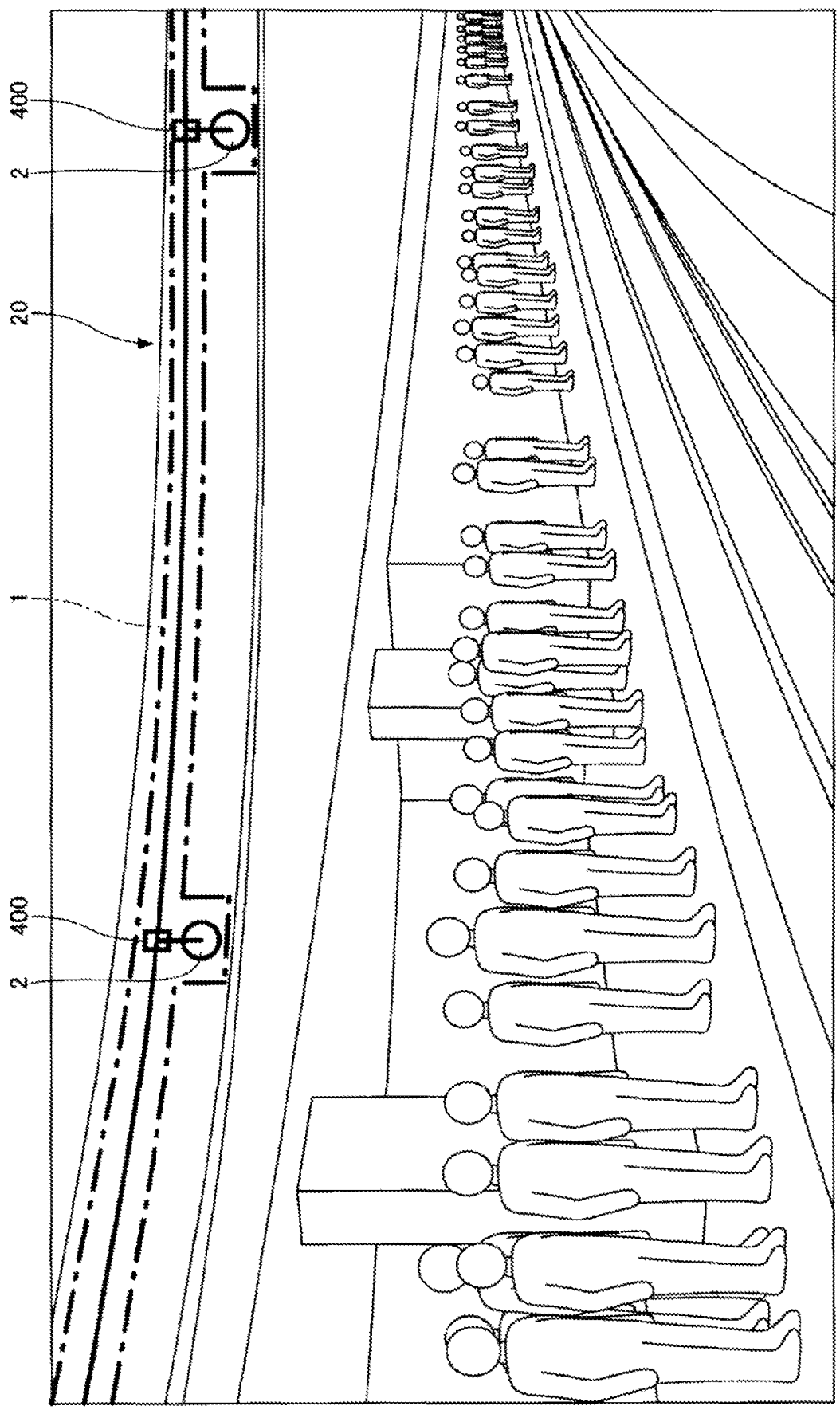
FIG. 17 is a diagram illustrating an example of a scene in which the distributed antenna of the branch connection type is installed on a ceiling surface of a station.

FIG. 16 is an enlarged view of the distributed antenna of the branch connection type. FIG. 17 is a diagram illustrating an example of a scene in which the distributed antenna of the branch connection type is installed on a ceiling surface of a station. As shown in FIG. 17, by disposing the distributed antenna of the branch connection type 20 on a wall surface that forms a depression in the ceiling of a platform in the station, for example, the antenna element 2 can be provided at a distal end of the transmission line 3 branched from the strip member 1 to the lower side. Thus, a distance from a portable terminal, held by a passenger waiting for a train on the station platform, to the antenna element 2 can be made as close as possible, and an electric field strength is increased, thereby improving the communication quality.

Figure 18:
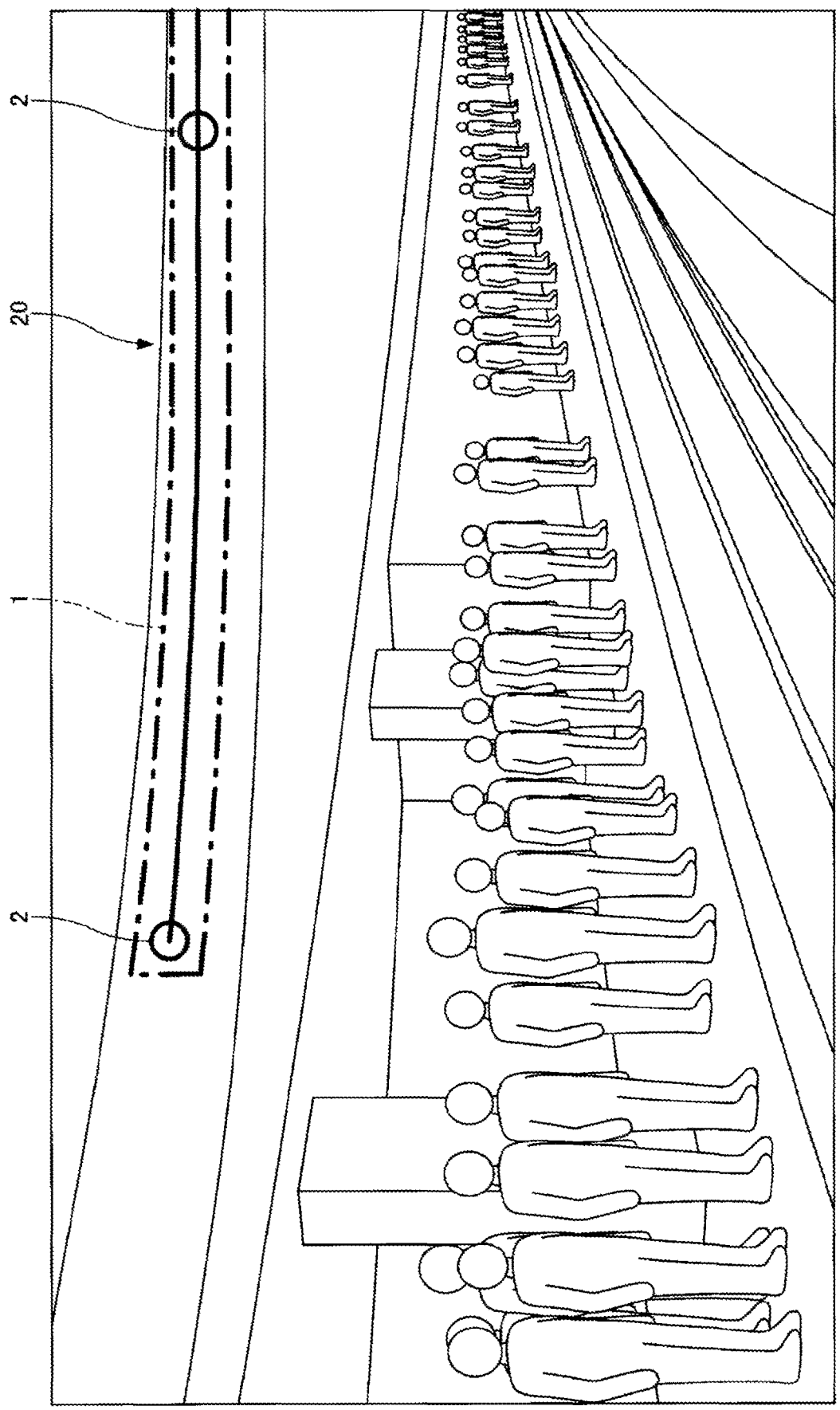
FIG. 18 is a diagram illustrating an example of a scene in which the distributed antenna of the cascade connection type is installed on the ceiling surface of the station.

FIG. 18 is a diagram illustrating an example of a scene in which the distributed antenna of the cascade connection type is installed on the ceiling surface of the station. As shown in FIG. 18, by disposing the distributed antenna of the cascade connection type 20 on the wall surface that forms a depression in the ceiling of the platform in the station, for example, a width of the strip member 1 in a direction perpendicular to the extension direction of the transmission line 3 can be narrowed, so that the coverage area can be expanded without degrading the design of the station.

Figure 19:
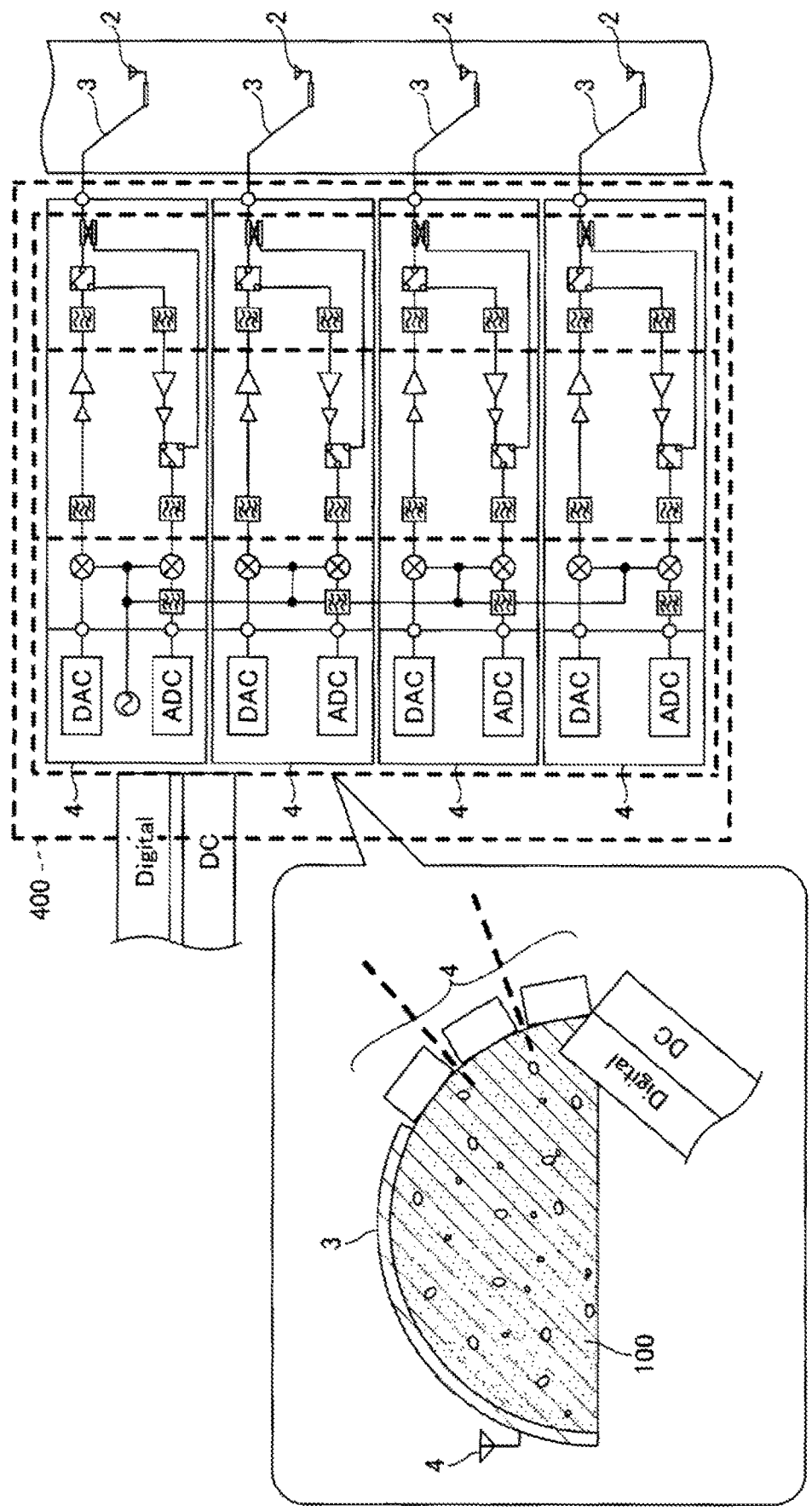
FIG. 19 is a diagram illustrating an example of the signal processing circuit according to a variation of the embodiment.

Next, a variation of the signal processing circuit will be described with reference to FIG. 19. FIG. 19 is a diagram illustrating the variation of the signal processing circuit. FIG. 19 depicts an example in which the signal processing circuit 4 is configured by a plurality of circuit boards, and each circuit board is provided on the wall 100 of the building, on the transmission line 3 or near the transmission line 3. The number of circuit boards is not limited to that shown in the drawing (three), but may be two or more. As described above, by configuring the signal processing circuit 4 with a plurality of circuit boards, the signal processing circuit 4 can be installed according to the shape of the location where the distributed antenna 20 is installed, so that usable locations of the distributed antenna 20 can be increased without impairing the design of the building.

Figure 20:
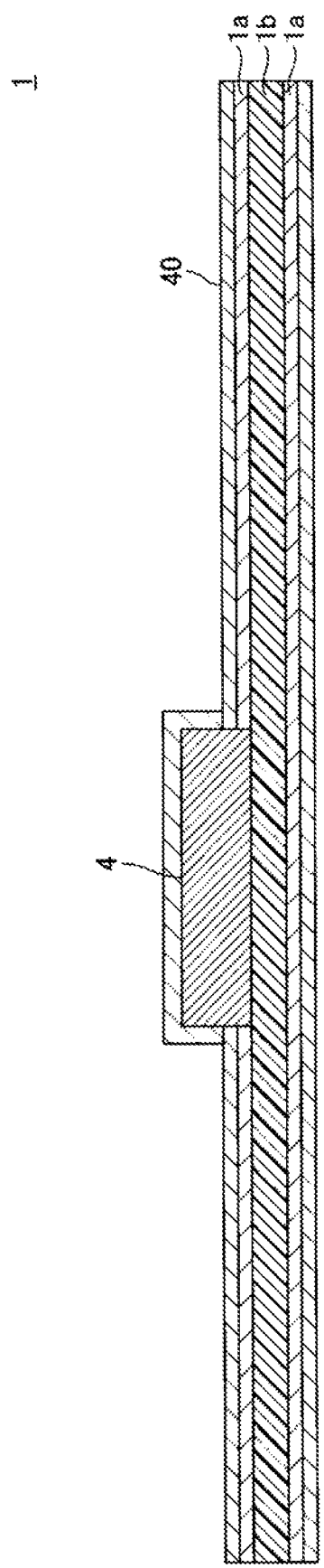
FIG. 20 is a diagram depicting an example of a strip member according to a first variation of the embodiment.
Figure 21:
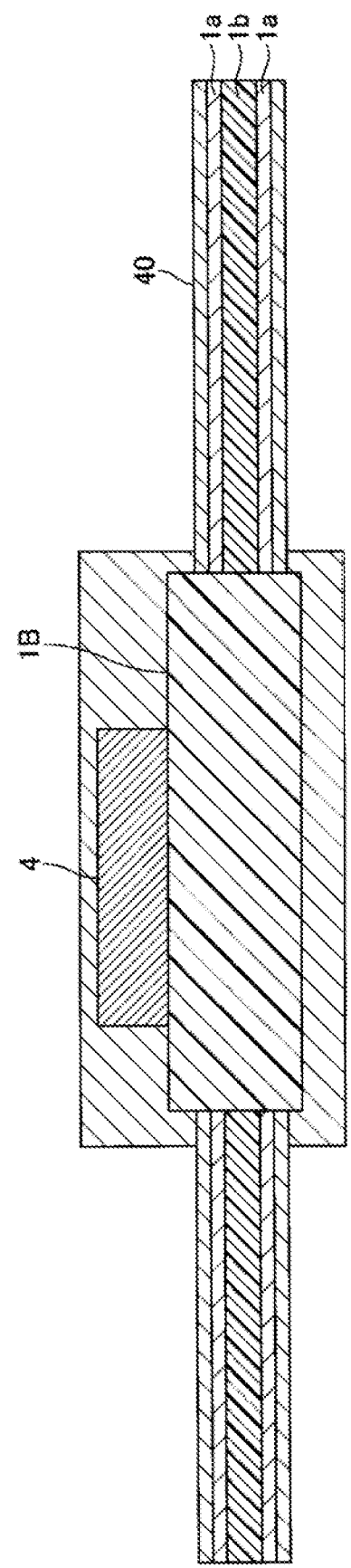
FIG. 21 is a diagram depicting an example of a strip member according to a second variation of the embodiment.

Next, a shielding member covering surfaces of the signal processing circuit 4, the strip member 1, and the like of the distributed antenna 20, will be described with reference to FIGS. 20 and 21. FIG. 20 is a diagram illustrating a strip member according to a first variation of the embodiment. FIG. 20 depicts a shielding member 40 that covers the entire surface of the strip member 1 formed of a flexible substrate, for example. FIG. 21 is a diagram illustrating a strip member according to a second variation of the embodiment. FIG. 21 depicts a shielding member 40 that covers the entire surface of the strip member 1 in which a flexible core member and a rigid core member are combined with each other. The shielding member 40 is made of a metal material or a non-metal material with excellent thermal conductivity that covers the entire surface of the strip 1 including the signal processing circuit 4. The material of the shielding member 40 may be, for example, a high thermal conductivity resin compound, a carbon sheet, solder, or an Ag—Cu sintered body, as shown in (1) to (4) below. It should be noted that the material of the shielding member 40 is not limited thereto.

(1) A high thermal conductivity resin compound in which a thermally conductive filler is added to a polymer component The polymer components include polysiloxane (silicone polymer), polyacrylic, polyolefin, and the like. It should be noted that the method of manufacturing the high thermal conductivity resin compound is publicly known as published in, for example, Japanese Patent No. 5089908 and Japanese Patent No. 5085050, and the description thereof will be omitted.

(2) Carbon sheet formed of carbon fibers, a composite material of carbon fibers and carbon, or the like Carbon sheet can be classified as a material with relatively low thermal conductivity and low cost, because a technology of mass-producing carbon sheets in a short time is being established with the background that in recent years many products using carbon fiber have been produced. Further, carbon sheet has an advantage that a time required for producing the distributed antenna 20 is short. For example, the production time can be shortened because it is not necessary to prepare a dedicated reflow furnace and a process from heating to cooling is unnecessary, although a material unit price is higher than that of solder or an Ag—Cu sintered body.

(3) Solder (lead-free solder, or the like)

Although production of solder requires a reflow furnace and the like, in the case of mass-producing distributed antennas 20, solder has an advantage that it is possible to suppress an increase in manufacturing cost for a single distributed antenna 20 according to the low material cost of solder. Moreover, the thermal conductivity of solder can be made higher than that of carbon sheet.

(4) Ag—Cu sintered body (Ag—Cu alloy containing Cu)

Although Ag—Cu sintered body is an expensive material because it contains silver (Ag), the Ag—Cu sintered body has a high thermal conductivity and is suitable for heat dissipation of the signal processing circuit 4.

The shielding member 40 is secured to the strip member 1 so as to be in close contact with the surface of the signal processing circuit 4 and the strip member 1. It is desirable that the shielding member 40 be made of a material having a higher thermal conductivity than, for example, the thermal conductivity of the signal processing circuit 4.

By providing the shielding member 40, heat generated by the signal processing circuit 4 is transferred to the shielding member 40 and radiated to the air from a surface of the shielding member 40 (the surface opposite to the side of the signal processing circuit 4). Thus, by providing the shielding member 40, the number of conduction paths for heat generated by the signal processing circuit 4 increases, so that the temperature of the signal processing circuit 4 can be prevented from exceeding the allowable temperature. In addition, since the shielding structure covering the signal processing circuit 4 is formed, unnecessary radiation is suppressed, and the influence of noise on a device provided around the distributed antenna 20 is reduced. Thus, the electromagnetic compatibility (EMC) performance is improved. Even when an electronic device is present near the distributed antenna 20, by the shielding member 40, the conductive portion 1a and the signal processing circuit 4 are covered with the shielding member 40, so that the capacitive coupling between the conductive portion 1a and the electronic device is unlikely to occur, and the influence on the antenna characteristic can be reduced.

Figure 22:
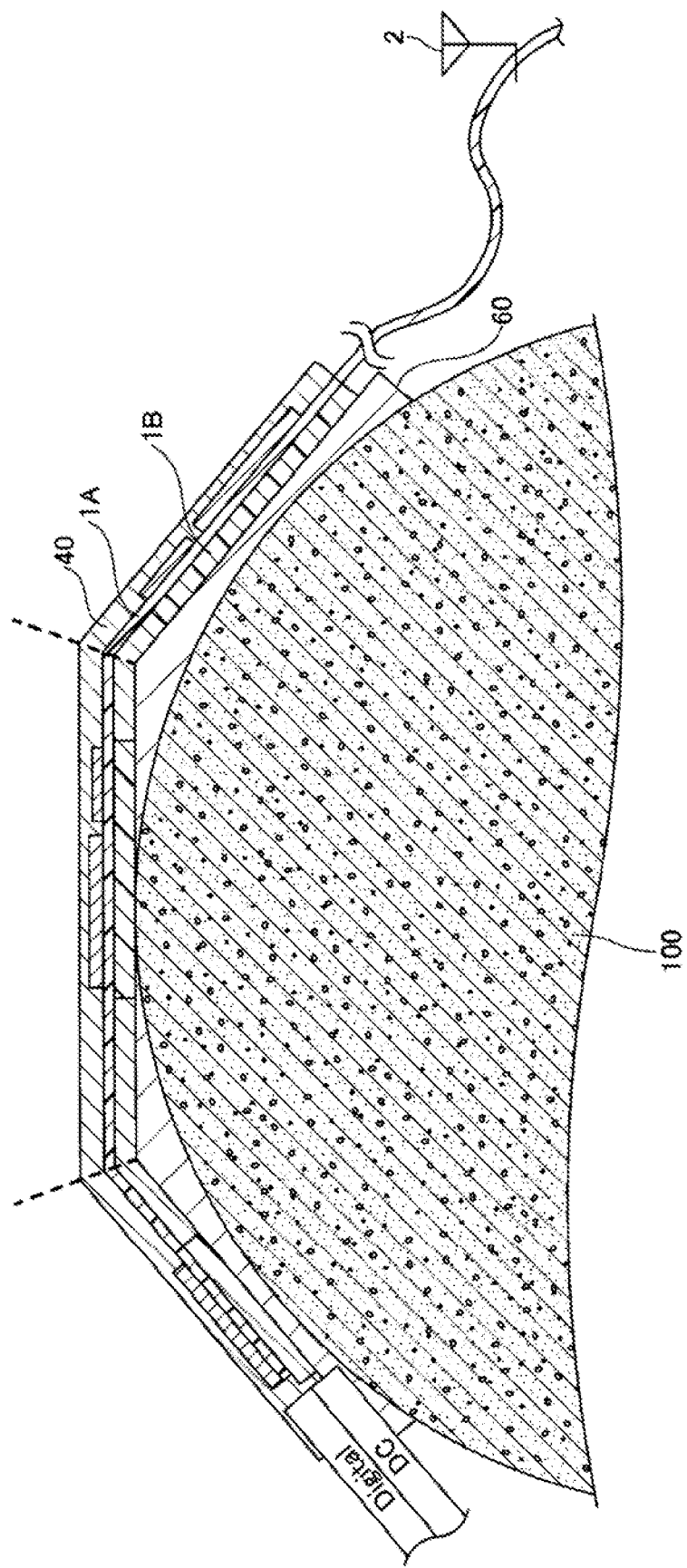
FIG. 22 is a diagram depicting an example of a configuration of a flexible module.

Next, an example of a configuration of the flexible module will be described with reference to FIG. 22. FIG. 22 is a diagram illustrating an example of a configuration of the flexible module. In the flexible module shown in FIG. 22, the rigid flexible substrate which was previously described and the shielding member 40 are combined with each other. As shown in FIG. 22, the rigid flexible substrate includes a rigid portion 1B, which is a rigid core member mounting a component or the like;

and a flexible portion 1A, which is a flexible core member that can be curved. The rigid flexible substrate is provided with the shielding member 40 so as to cover the entirety of the rigid portion 1B and the flexible portion 1A. The rigid flexible substrate may be provided with a power amplifier 404, a switch 405, and the like that constitute the signal processing circuit 4. By providing such a flexible module on a wall 100 or the like of a building, the signal processing circuit 4 is covered by the shielding member 40 to improve the EMC performance, and usable locations of the distributed antenna 20 can be increased without impairing design of the building or the like. For fixing the flexible module to the wall 100 of the building or the like, an adhesive portion 60 may be used in the case of fixing the flexible module permanently, or a binding band or the like may be used in the case of temporarily arranging the flexible module.

Figure 23:
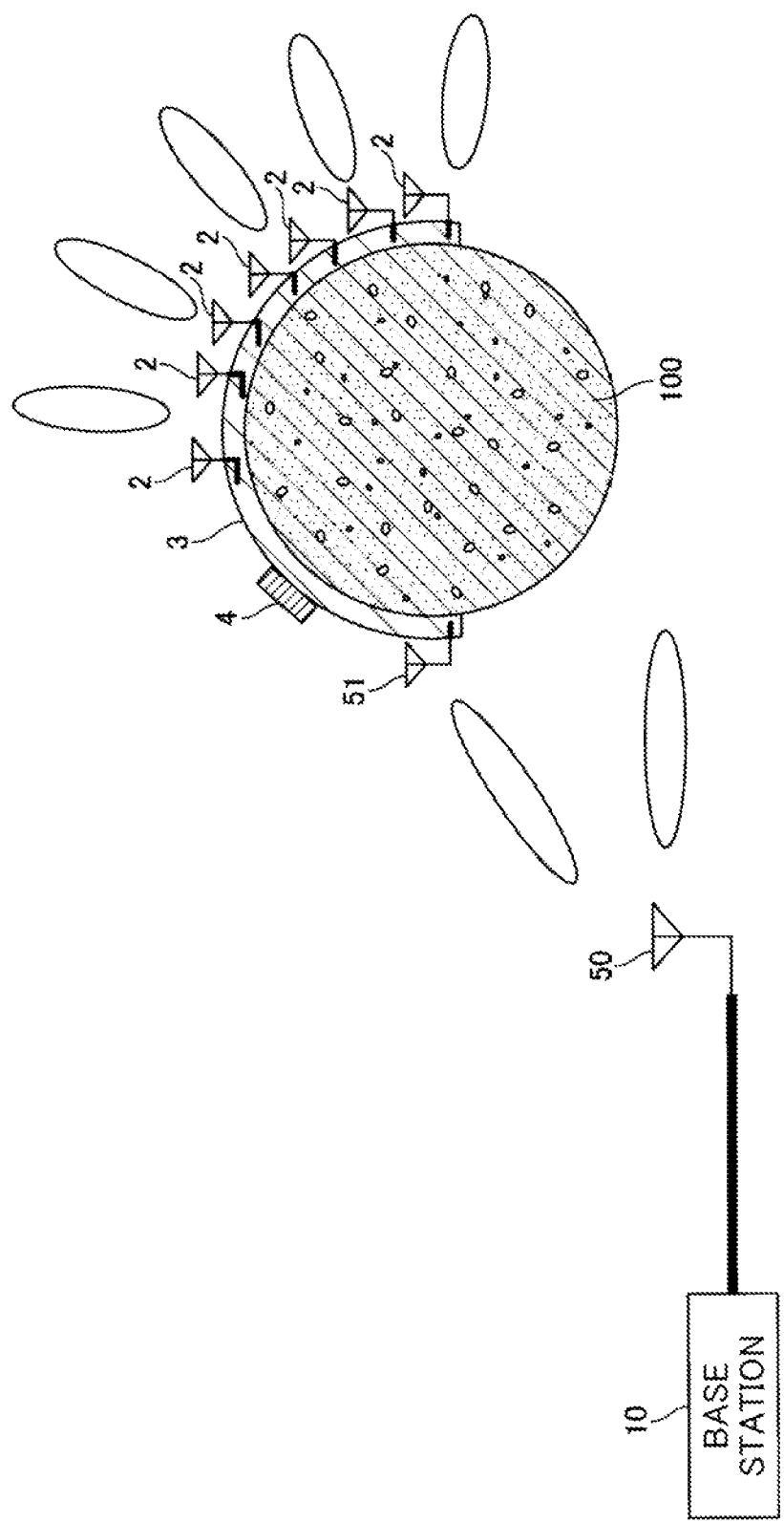
FIG. 23 is a diagram depicting an example of a configuration of a distributed antenna for a repeater.

Next, referring to FIG. 23, an example of a configuration in which the distributed antenna 20 is used as a repeater antenna will be described. FIG. 23 is a diagram depicting an example of a configuration of a distributed antenna for a repeater. The distributed antenna 20 shown in FIG. 23 includes a reception antenna 51 for receiving radio waves transmitted from a transmission antenna 50 connected to the base station 10. The antenna element 2, which is located at a location different from the location where the reception antenna 51 is disposed, within the surface of the wall 100, relays (re-radiates) the radio waves received by the reception antenna 51 in a direction different from, for example, the direction in which the radio waves came to the reception antenna 51. According to the above-described arrangement, the cost of constructing an entrance line from the base station 10 to the distributed antenna 20 can be significantly reduced, even when the distance from the base station 10 to the distributed antenna 20 is long. It should be noted that the same applies to the case when transmission and reception are switched. The use of 5G radio waves for the entrance line is standardized as Integrated Access and Backhaul (IAB).

As described above, the distributed antenna according to the embodiment of the present application includes a strip member, which is a strip-shaped dielectric body; a transmission line provided on the strip member; and a plurality of antenna elements connected to the transmission line and disposed in a distributed manner on the strip member. For example, in order to perform good wireless communication with a plurality of portable terminals present in audience seats in a stadium or the like, it is desirable that the distances between the plurality of antennas connected to the wireless base station and the portable terminals are short. However, conventionally the plurality of antennas must be provided on a particular structure in the stadium, such as a roof located above the audience seats or a column supporting the roof, that make it difficult to equalize the distance between the plurality of portable terminals and the plurality of antennas. Accordingly, there have been problems such as unstable wireless communication quality. In addition, there was a problem that sure connection of the transmission line to the antenna may be difficult. According to the distributed antenna of the present embodiment, since the strip member can be arranged so as to bridge in an upper space of the audience seats of the stadium, or trained on the slope below the audience seats, for example, the coverage area can be expanded without affecting the structure or construction of the building. Because the distributed antenna according to the present embodiment is provided with the signal processing circuit including a power amplifier 404, a low noise amplifier 407, or the like, the radio communication level can be compensated for even when the distance from the base station 10 increases.

(Effect to Propagation Characteristics of Radio Waves Due to Obstacles)

Next, an effect due to obstacles to the propagation characteristics of radio waves will be described with reference to FIGS. 24 to 28. The inventors of the present application investigated using conventional antennas 80A and 80B the effect due to obstacles to the propagation characteristics of radio waves, as described below.

Figure 24:
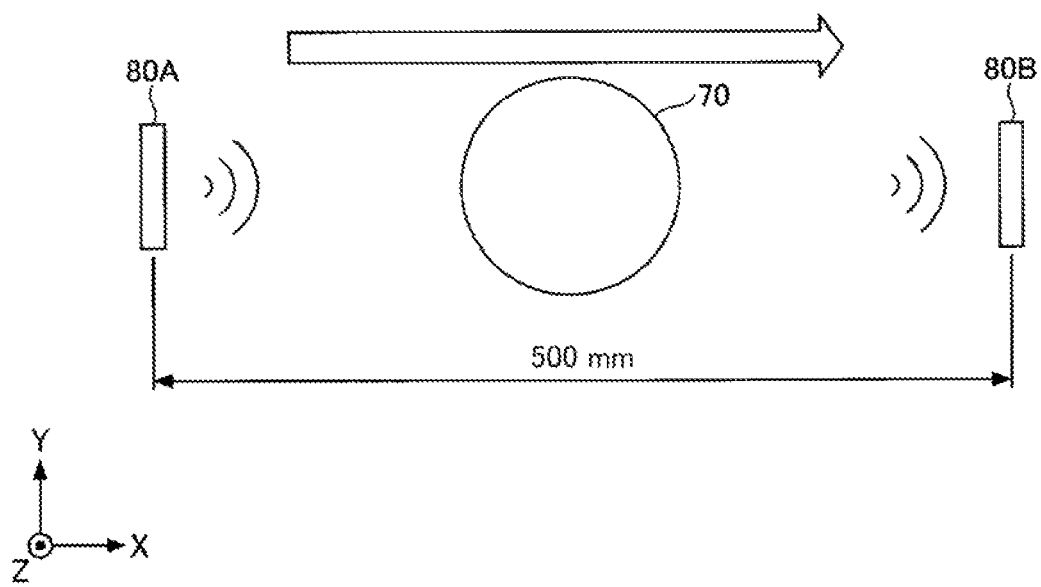
FIG. 24 is a diagram illustrating an arrangement of antennas and a column in a test in the present application.

FIG. 24 is a diagram depicting an arrangement of the antennas 80A and 80B and a column 70 in the test. As shown in FIG. 24, the inventors of the present invention placed the conventional antenna 80A and the conventional antenna 80B opposite each other. In this test, the inventors of the present invention set a separation distance between the antenna 80A and the antenna 80B to 500 mm. The inventors of the present invention also placed a cylindrical column 70 as an example of the obstacle at an intermediate position between the antenna 80A and the antenna 80B. The inventors of the present invention then performed measurements regarding effect of presence or absence of the column 70 and of a diameter of the column 70 to the propagation characteristics of radio waves transmitted from the antenna 80A to the antenna 80B.

Figure 25:
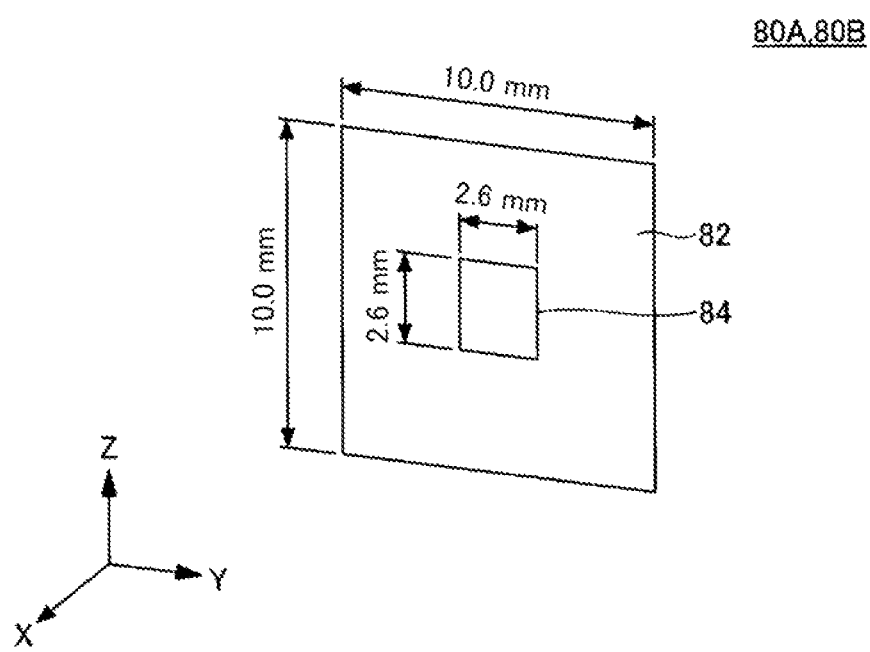
FIG. 25 is a diagram illustrating a configuration of the antenna used in the test.

FIG. 25 is a diagram illustrating a configuration of the antennas 80A and 80B used in the present test. In the test, patch antennas of 28 GHz band were used for the antennas 80A and 80B. As shown in FIG. 25, each of the antennas 80A and 80B has a substrate 82 and an antenna element 84. As shown in FIG. 25, in the present test, the shape of the substrate 82 was square and a length of one side of the substrate 82 was 10.0 mm. Further, as shown in FIG. 25, in the present test, the shape of the antenna element 84 was square and a length of one side of the antenna element 84 was 2.6 mm.

Figure 26:
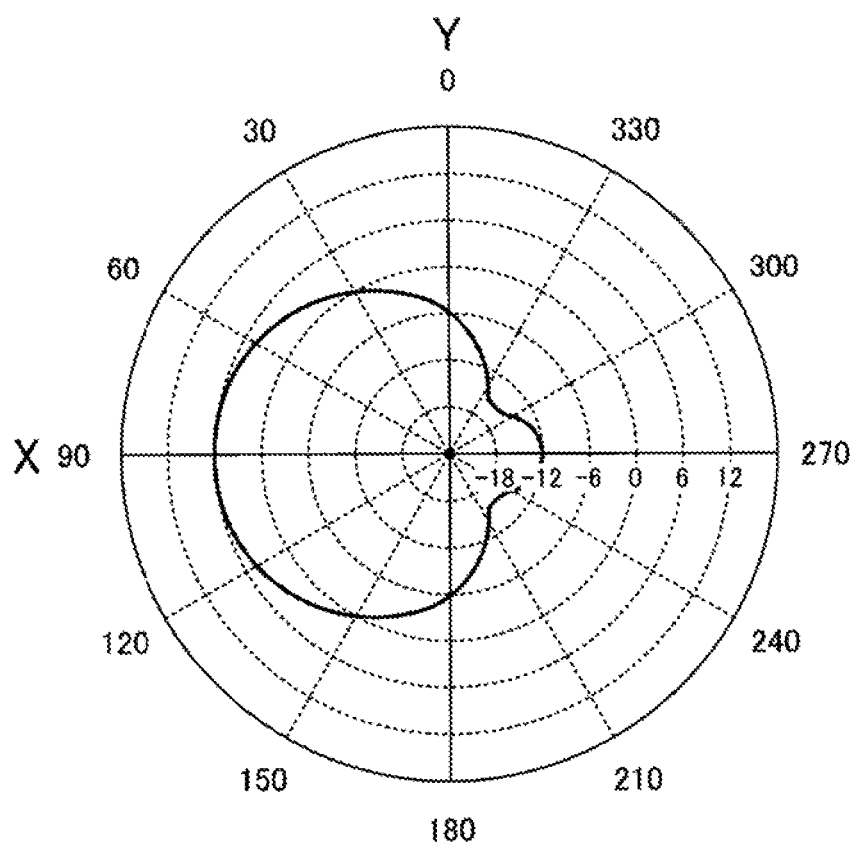
FIG. 26 is a diagram showing antenna characteristics of the antenna used in the test.

FIG. 26 is a diagram illustrating antenna characteristics (XY plane directivity) of the antennas 80A and 80B used in the present test. As shown in FIG. 26, the antennas 80A and 80B have strong directivity in the X-axis direction (perpendicular to the surface of the antenna element 84). Further, the antennas 80A and 80B can obtain 5.5 dBi in the X-axis direction as the maximum gain in the 28 GHz band.

Figures 27, 28:
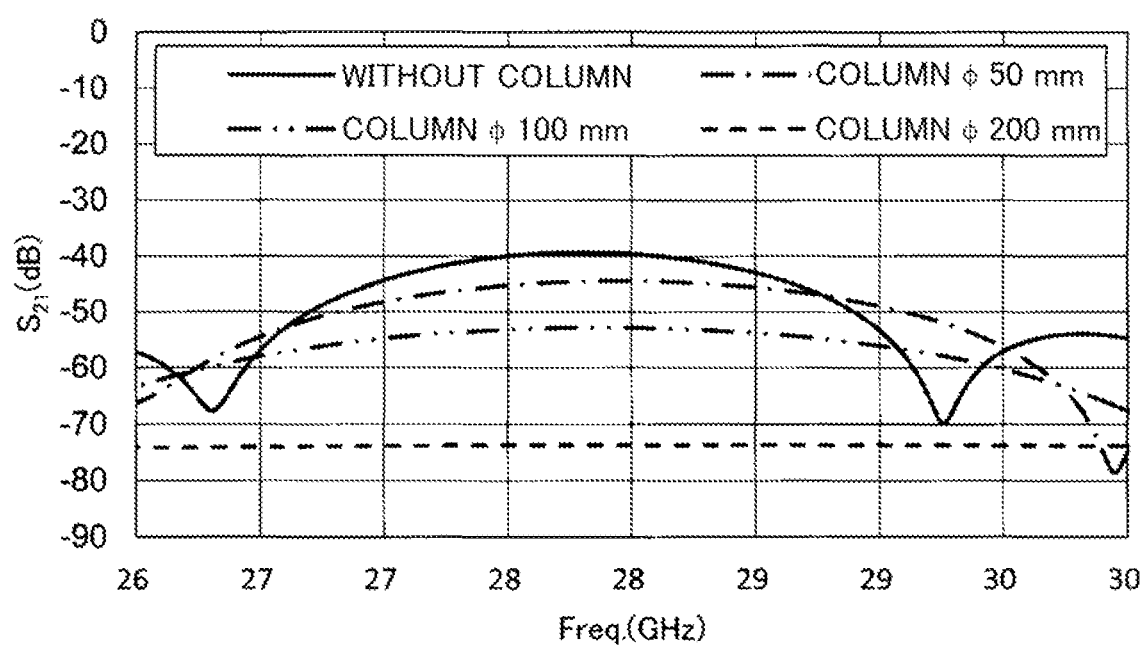
FIG. 27 is a list showing a result of measurement (S21) in the test for each installation condition of the column.
FIG. 28 is a diagram showing the result of the measurement (S21) in the test for each installation condition of the column.

FIG. 27 is a list showing a result of measurement (S21) in the test for each installation condition of the column 70. FIG. 28 is a diagram showing results of the test (S21) for each installation condition of the column 70. As shown in FIGS. 27 and 28, a transmission coefficient (S21) of radio waves propagated from the antenna 80A to the antenna 80B was measured for each of the case in which the column 70 was not installed and the cases in which the diameters of the column 70 were 50 mm, 100 mm, and 200 mm.

As shown in FIGS. 27 and 28, according to the test, the transmission coefficient (S21) for 28 GHz band radio wave of "−39.6 dB" was obtained, when the column 70 is absent. On the other hand, when the column 70 with the diameter of 50 mm was present, the transmission coefficient (S21) for 28 GHz band radio wave of "−44.4 dB" was obtained. In addition, when the column 70 with the diameter of 100 mm was present, the transmission coefficient (S21) for 28 GHz band radio wave of "−52.8 dB" was obtained. Furthermore, when the column 70 with the diameter of 200 mm was present, the transmission coefficient (S21) for 28 GHz band radio wave of "−73.7 dB" was obtained. From the results of measurements, it was found that due to the presence of the column 70 the value of the coefficient S21 decreases (i.e., radio wave does not reach easily). According to the test it was found that as the diameter of the column 70 increases, the value of the coefficient S21 decreases (i.e., radio wave does not reach easily).

In other words, this test revealed that when an obstacle such as a column exists on a propagation path of radio waves emitted from the antenna, radio waves do not easily reach the area behind the obstacle (blind area). In particular, radio waves of the millimeter-wave band used in 5G or the like do not easily reach the blind area of the obstacle due to a low diffraction efficiency. Accordingly, the inventors of the present application have invented a flexible antenna 20A, which will be described below, for the purpose of more reliably enabling attainment of radio waves in a plurality of directions around obstacles such as columns.

(Flexible Antenna 20A)

Next, referring to FIGS. 29 to 44, as another example of the distributed antenna 20, a flexible antenna 20A will be described. The flexible antenna 20A can be mounted on a column 70 (an example of a "columnar installation object") such as a signal, a street lamp, or a utility pole. The flexible antenna 20A can be used, for example, as a 5G antenna for a base station.

Figure 29:
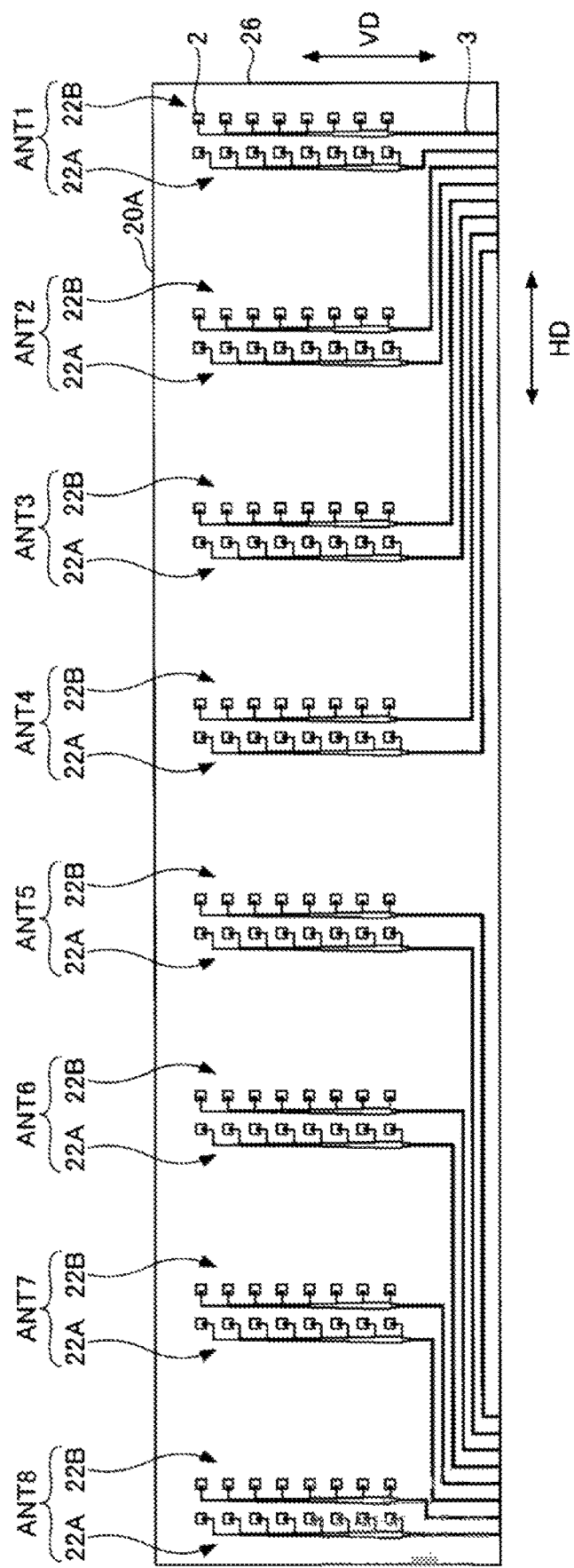
FIG. 29 is a plan view illustrating an example of a flexible antenna according to an embodiment of the present application.

FIG. 29 is a plan view illustrating the flexible antenna 20A according to the embodiment of the present application. As shown in FIG. 29, the flexible antenna 20A includes a flexible substrate 26 and a plurality of antennas ANT1 to ANT8.

The flexible substrate 26 is a sheet-like member having flexibility. The flexible substrate 26 has a landscape rectangular shape in a plan view. The plurality of antennas ANT1 to ANT8 are disposed equally spaced in the horizontal direction HD on the surface of the flexible substrate 26. Each of the plurality of antennas ANT1 to ANT8 has an antenna for vertically polarized waves 22A and an antenna for horizontally polarized waves 22B.

The antenna for vertically polarized waves 22A includes a plurality of antenna elements 2 (eight in the example shown in FIG. 29) disposed side by side in the vertical direction VD; and a transmission line 3 extending linearly in the vertical direction VD. A branch path from the transmission line 3 is connected to a right angle to a lower side of each of the plurality of antenna elements 2 of the antenna for vertically polarized waves 22A.

The antenna for horizontally polarized waves 22B includes a plurality of antenna elements 2 (eight in the example shown in FIG. 29) disposed side by side in the vertical direction VD; and a transmission line 3 extending linearly in the vertical direction VD. A branch path from the transmission line 3 is connected to a right angle to a left side of each of the plurality of antenna elements 2 of the antenna for horizontally polarized waves 22B.

Each of the plurality of antennas for vertically polarized waves 22A and the plurality of antennas for horizontally polarized waves 22B has an independent connection port at the lower end of the transmission line 3. Thus, the signal processing circuit 4 connected to the flexible antenna 20A can independently use each of the plurality of antennas for vertically polarized waves 22A and the plurality of antennas for horizontally polarized waves 22B for radiation of radio waves via the plurality of connection ports.

In addition, in the antenna for vertically polarized waves 22A and the antenna for horizontally polarized waves 22B, a straight-line portion extending in the vertical direction VD of the transmission line 3 has a shape in which a band width gradually decreases toward a distal end. Thus, the antenna for vertically polarized waves 22A and the antenna for horizontally polarized waves 22B can evenly distribute energy supplied from the connection port of the transmission line 3 to the plurality of antenna elements 2 connected to the transmission line 3.

Figure 30:
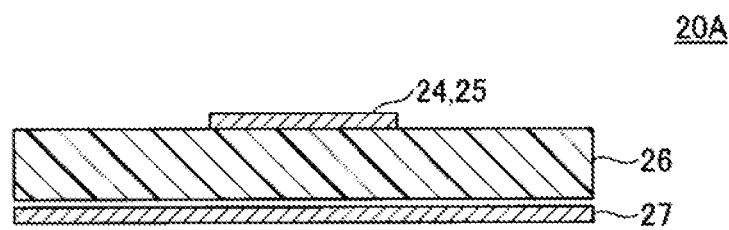
FIG. 30 is a cross-sectional view depicting an example of a structure of the flexible antenna according to the embodiment.

FIG. 30 is a diagram illustrating an example of a cross-sectional structure of the flexible antenna 20A according to the embodiment of the present application. In the example shown in FIG. 30, the flexible antenna 20A includes a flexible substrate 26, an antenna element 24, a transmission line 25, and a ground layer 27.

The flexible substrate 26 is a flexible, resinous and thin film-like member having flexibility and formed of a resin. For example, a thickness of the flexible substrate 26 falls within a range from 1 μm to 300 μm. For example, the flexible substrate 26 is formed of a resin material, such as a fluororesin, cycloolefin polymer (COP), polyethylene terephthalate (PET), polyethylene naphthalate (PEN), polyimide, polyether ether ketone (Peek), liquid crystal polymer (LCP), or another composite material.

The antenna element 24 and the transmission line 25 are formed in a thin film state on an upper surface of the flexible substrate 26. The thicknesses of the antenna element 24 and the transmission line 25 fall within a range, for example, from 1 nm to 32 μm. The antenna element 24 and the transmission line 25 are formed of, for example, an electrically conductive material such as copper.

The ground layer 27 is formed in a thin film state on a lower surface of the flexible substrate 26. For example, the thickness ground layer 27 falls within a range, for example, from 1 nm to 32 μm. The ground layer 27 is formed of, for example, an electrically conductive material such as copper.

Figure 31:
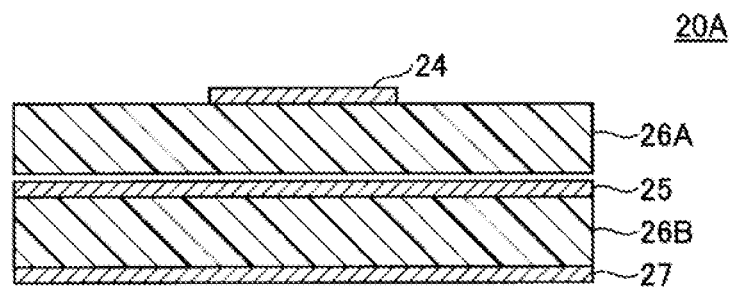
FIG. 31 is a cross-sectional view depicting another example of the structure of the flexible antenna according to the embodiment.

FIG. 31 is a diagram illustrating another example of the cross-sectional configuration of the flexible antenna 20A according to the embodiment of the present application. In the example shown in FIG. 31, the flexible antenna 20A has a first flexible substrate 26A and a second flexible substrate 26B overlapping each other, instead of the flexible substrate 26 shown in FIG. 30.

In the example shown in FIG. 31, the antenna element 24 is formed on an upper surface of the first flexible substrate 26A. In the example shown in FIG. 31, the transmission line 25 is formed between the first flexible substrate 26A and the second flexible substrate 26B. In the example shown in FIG. 31, the ground layer 27 is formed on a lower surface of the second flexible substrate 26B.

Figure 32:
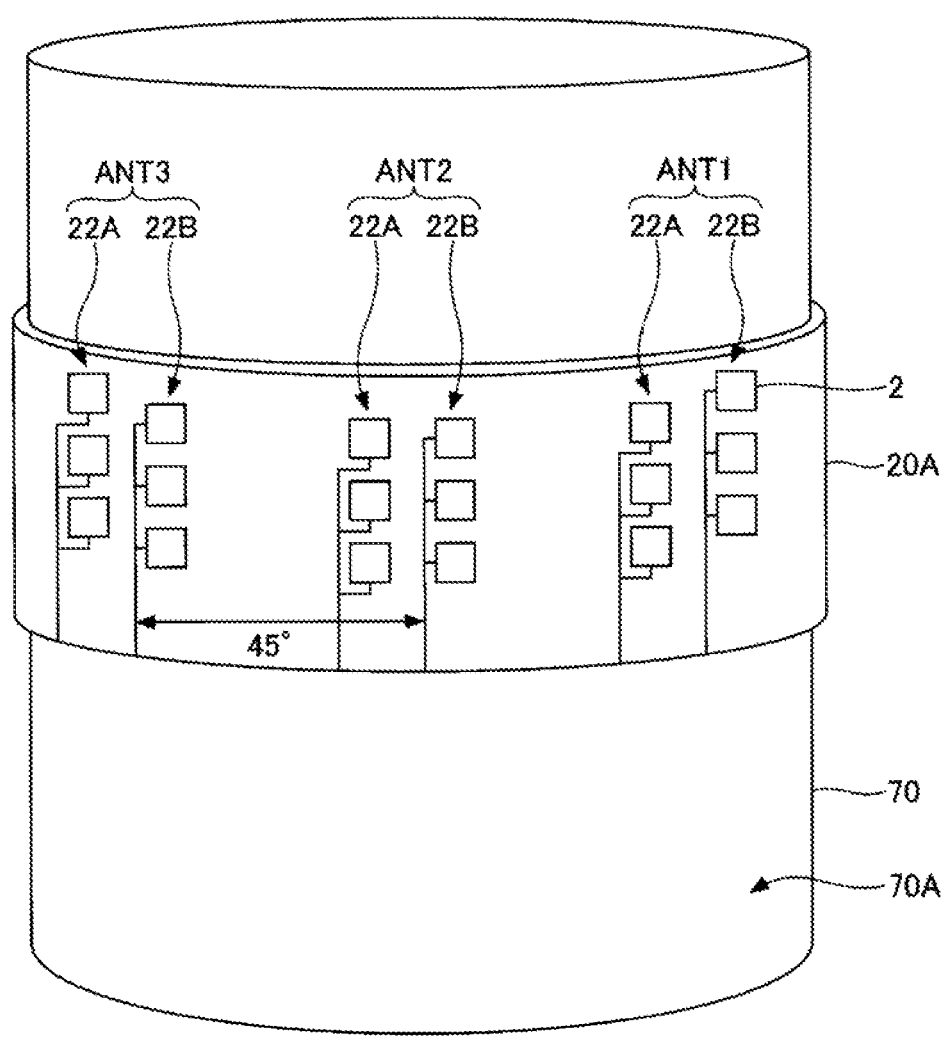
FIG. 32 is a diagram illustrating an example of the flexible antenna mounted on a column according to the embodiment.
Figure 33:
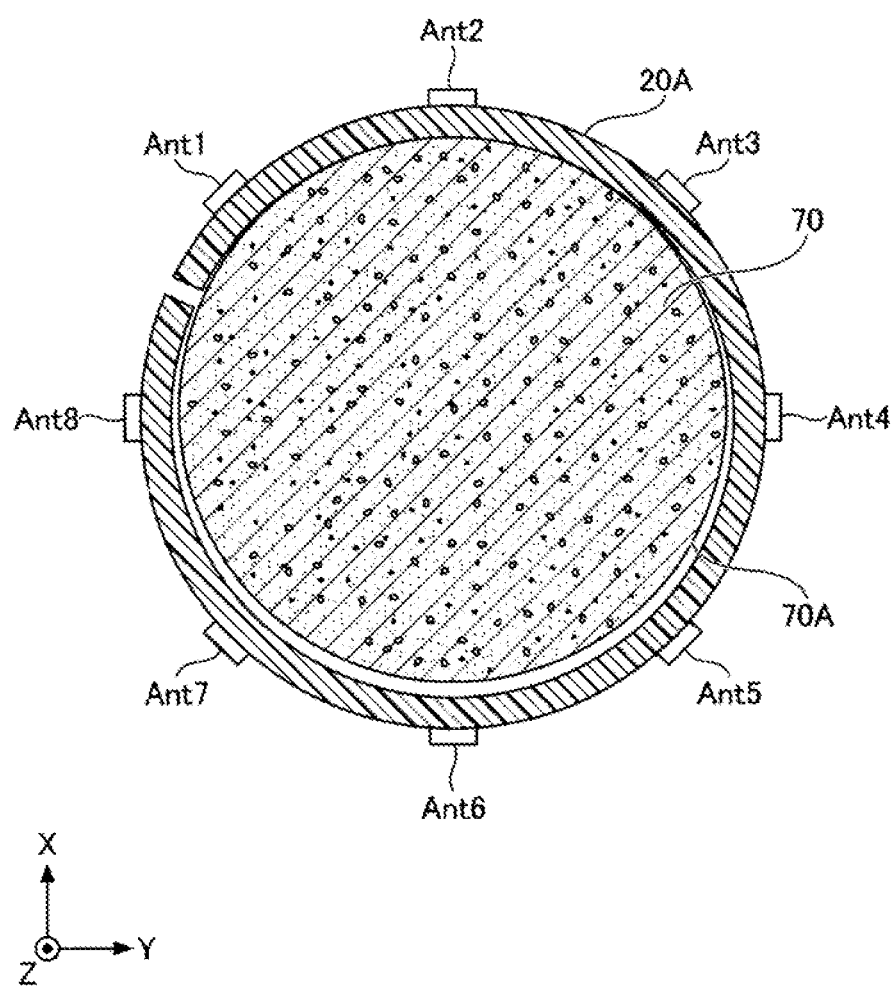
FIG. 33 is a cross-sectional view along the XY plane depicting an example of the flexible antenna according to the embodiment shown in FIG. 32.

FIG. 32 is a diagram illustrating an example of installation of the flexible antenna 20A to a column 70 according to the embodiment of the present application. FIG. 33 is a cross-sectional view along the XY plane depicting an example of the flexible antenna 20A and the column 70 shown in FIG. 32.

As shown in FIGS. 32 and 33, the flexible antenna 20A has a flexibility, and can be wrapped around an outer peripheral surface 70A of the column 70. Thus, the flexible antenna 20A can emit vertically polarized waves and horizontally polarized waves by each of the plurality of antennas ANT1 to ANT8 in the plurality of directions (eight directions for the configuration shown in FIG. 29) with the column 70 as a center.

In particular, in the example shown in FIGS. 32 and 33, the antennas ANT1 to ANT8 are disposed on the outer peripheral surface 70A of the column 70 at 45° intervals. Thus, the flexible antenna 20A can emit vertically polarized waves and horizontally polarized waves, by each of the plurality of antennas ANT1 to ANT8, in eight directions at 45° intervals with the column 70 as a center.

According to the flexible antenna 20A of the embodiment of the present application, radio waves can be surely delivered in each of the plurality of directions around the column 70.

Also, in the flexible antenna 20A according to the embodiment, each of the plurality of antennas ANT1 to ANT8 includes an independent connection port. Therefore, the flexible antenna 20A according to the embodiment can radiate radio waves only in the necessary direction by driving (powering) a portion of the plurality of antennas ANT1 to ANT8 depending on a purpose of use, an installation location, or the like.

Further, the flexible antenna 20A according to the embodiment is a thin sheet with flexibility, and can be flexibly deformed along an installation surface. Therefore, the flexible antenna 20A according to the embodiment can be installed not only in cylindrical columns but also in various other columnar installation objects (e.g., rectangular columns, wall surfaces bent at right angles, or walls having recessed or protruding shapes) so that the flexible antenna 20A according to the embodiment does not protrude from the installation surface of the structure.

The flexible antenna 20A is fixed to the outer peripheral surface 70A of the column 70 by any fixing method (e.g., adhesive, or double-sided tape). The flexible antenna 20A may also be secured to the outer peripheral surface 70A of the columns 70 by connecting one end portion and the other end portion so as to form an annular shape.

The flexible antenna 20A may also be protected from rain water, ultraviolet rays, or the like by providing a protection film, a protection cover, or the like, on the surface, before the flexible antenna 20A is mounted on the outer peripheral surface 70A of the column 70 or after the flexile antenna 20A is mounted on the outer peripheral surface 70A of the column 70.

Also, when the diameter of the column 70, in which the flexible antenna 20A is to be installed, has been determined, the horizontal width of the flexible antenna 20A preferably has a length corresponding to the circumferential length of the outer peripheral surface of the column 70. In this case, when the flexible antenna 20A is mounted on the column 70, the one end portion and the other end portion in the horizontal direction of the flexible antenna 20A may overlap each other or may be slightly separated from each other. Further, when the flexible antenna 20A is mounted on the column 70 with the predetermined diameter, the plurality of antennas are preferably disposed at a predetermined angle (360°/number of antennas) interval with the column 70 as a center.

Figure 34:
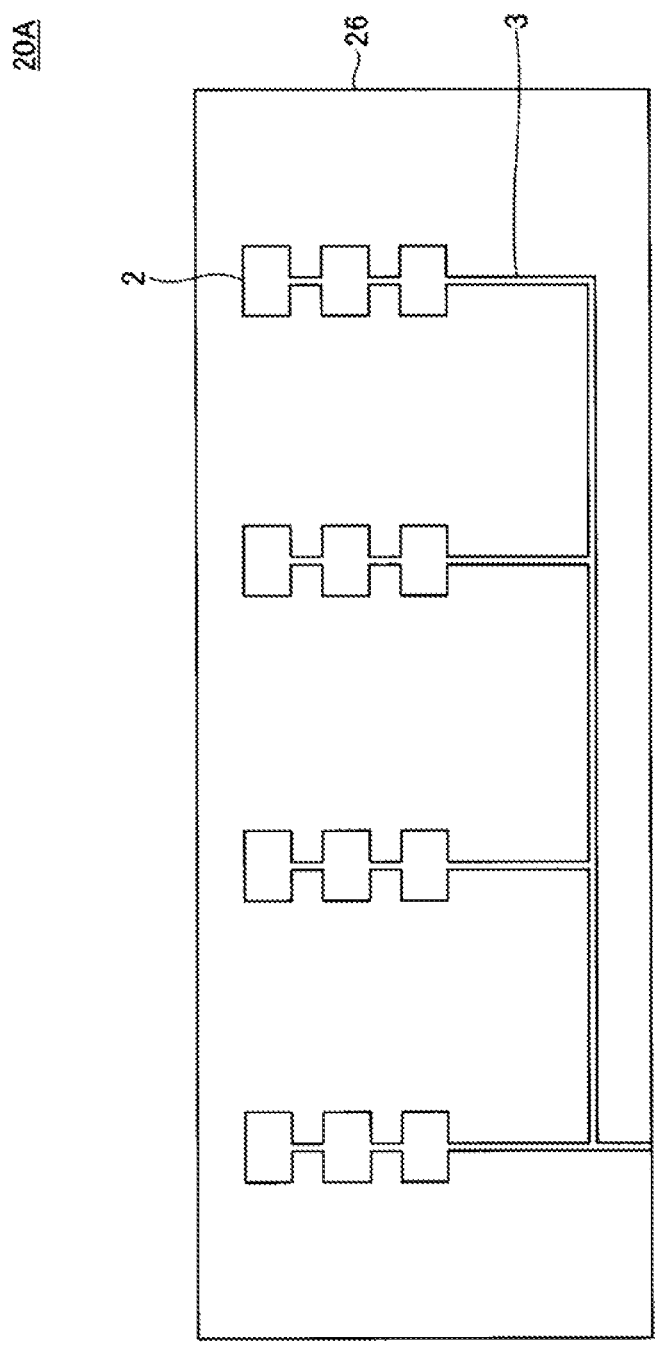
FIG. 34 is a diagram depicting an example of an antenna pattern in the flexible antenna according to the first variation of the embodiment.
Figure 35:
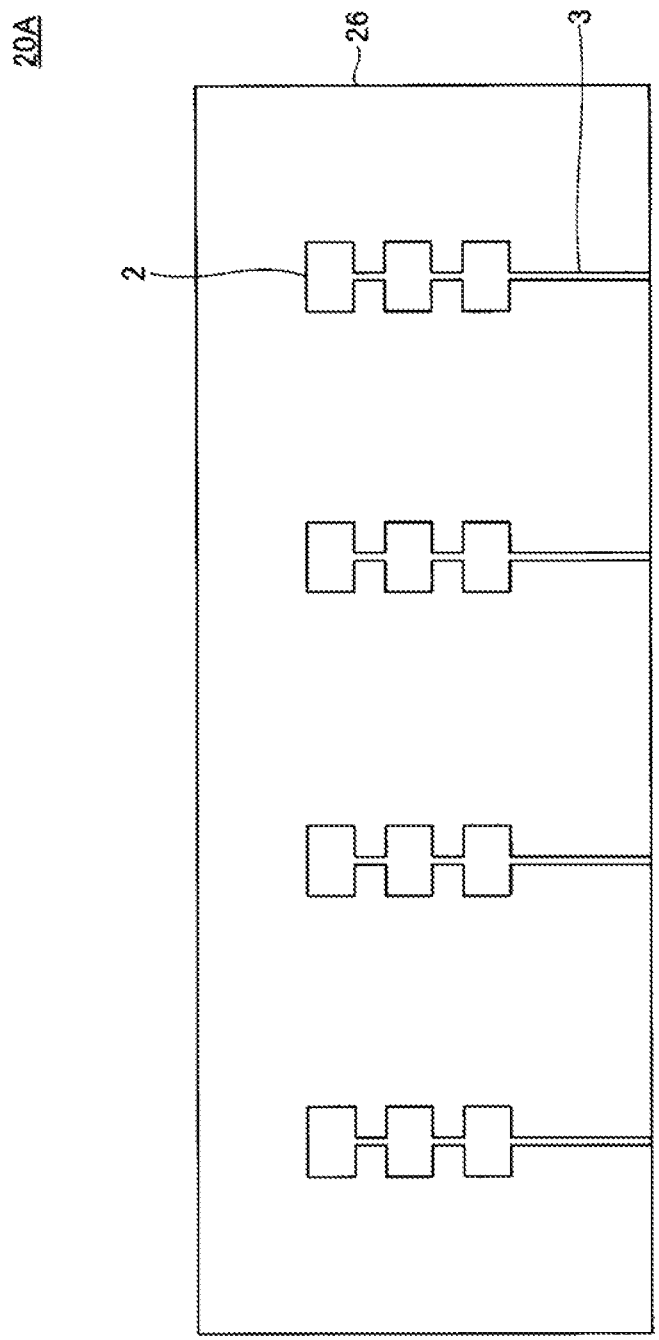
FIG. 35 is a diagram depicting an example of an antenna pattern in the flexible antenna according to the second variation of the embodiment.

FIG. 34 is a diagram illustrating an antenna pattern in the flexible antenna 20A according to a first variation of the embodiment of the present application. FIG. 35 is a diagram illustrating an antenna pattern in the flexible antenna 20A according to a second variation of the embodiment of the present application.

In the example shown in FIGS. 34 and 35, the flexible antenna 20A has four antennas disposed side by side equally spaced in the horizontal direction HD on the surface of the flexible substrate 26. Each of the four antennas has three antenna elements 2 arranged in the vertical direction VD. In each of the four antennas, the three antenna elements 2 are connected in series by transmission line 3 extending linearly in the vertical direction VD.

Thus, the flexible antenna 20A shown in FIGS. 34 and 35, when installed on the outer peripheral surface 70A of the columns 70, can emit vertically polarized waves by the three antenna elements 2 for each direction of the four directions with the column 70 as a center. In particular, when the flexible antenna 20A shown in FIGS. 34 and 35 is mounted on the outer peripheral surface 70A of the column 70 having a predetermined diameter, the four antennas can be disposed on the outer peripheral surface 70A of the column 70 at 90° intervals. In this case, the flexible antenna 20A shown in FIGS. 34 and 35 can emit vertically polarized waves by each of the four antennas in four directions at 90° intervals with column 70 as a center.

Note that in the flexible antenna 20A shown in FIG. 35, each of the four antennas has an independent connection port. Thus, the flexible antenna 20A shown in FIG. 35 can drive the four antennas individually, as necessary, i.e., can emit radio waves only in a particular direction. The flexible antenna 20A shown in FIG. 35 can transmit a plurality of different types of signals at the same time, or with a time difference by the four antennas. For example, the flexible antenna 20A shown in FIG. 35 can also be used for multiple-input and multiple-output (MIMO), beam forming, and the like.

Further, it is possible to control a direction of a beam in the vertical direction VD (elevation/depression angle direction) from the flexible antenna 20A shown in FIG. 34 and FIG. 35 by adjusting the interval in the vertical direction VD of the antenna elements 2 arranged in the vertical direction VD, and adjusting phases of the power supplied to the antenna elements 2.

For example, it is possible to control the direction of the beam to 0 degrees in the elevation angle direction by disposing the antenna elements 2 so that the interval in the vertical direction VD of the antenna elements 2 is about one wavelength, in an electrical length in the transmission line 3, that is, the antenna elements 2 have the same phase.

Further, for example, it is possible to control the direction of the beam to the elevation direction (up tilted) by disposing the antenna elements 2 so that the interval in the vertical direction VD of the antenna elements 2 is longer than one wavelength, in an electrical length in the transmission line 3, that is, phase delays between the antenna elements 2.

Further, for example, it is possible to control the direction of the beam to the depression direction (down tilted) by disposing the antenna elements 2 so that the interval in the vertical direction VD of the antenna elements 2 is shorter than one wavelength, in an electrical length in the transmission line 3, that is, phase advances between the antenna elements 2.

The same applies to the flexible antennas 22A and 22B shown in FIGS. 29 and 32. The beam direction in the vertical direction VD can be controlled by adjusting phases supplied to the antenna elements 2.

Incidentally, when the direction of the beam is controlled to 0 degrees in the elevation direction, the interval in the vertical direction VD is preferably set to be greater than or equal to 0.96 wavelengths and less than or equal to 1.04 wavelengths, in an electrical length in the transmission line 3.

Moreover, when the direction of the beam is controlled to the elevation direction (up tilted), the interval in the vertical direction VD is preferably set to be greater than or equal to 1.05 wavelengths and less than or equal to 1.50 wavelengths, in an electrical length in the transmission line 3.

Furthermore, when the direction of the beam is controlled to the depression direction (down tilted), the interval in the vertical direction VD is preferably set to be greater than or equal to 0.50 wavelengths and less than or equal to 0.95 wavelengths, in an electrical length in the transmission line 3.

On the other hand, the flexible antenna 20A shown in FIG. 34 has a single connection port connected to four antennas. Therefore, in the flexible antenna 20A shown in FIG. 34, it is possible to simultaneously drive the four antennas by supplying a drive signal from the signal processing circuit 4 to the single connection port, i.e., emit radio waves simultaneously in four directions.

FIG. 36 is a diagram illustrating an antenna pattern in the flexible antenna 20A according to a third variation of the embodiment of the present application.

In the example shown in FIG. 36, the flexible antenna 20A has four antenna elements 2 disposed side by side in the vertical direction VD at each of four positions along the horizontal direction HD on the surface of the flexible substrate 26. That is, the flexible antenna 20A shown in FIG. 36 has 16 antenna elements 2 arranged in a form of matrix of 4×4 on the surface of the flexible substrate 26. The flexible antenna 20A shown in FIG. 36 is provided with independent transmission lines 3 for the 16 antenna elements 2, respectively. For each of the 16 antenna elements 2, an end portion of the transmission line 3, which is bent at right angles to the horizontal direction HD, is connected to a right angle to a left side or a right side of each of the 16 antenna elements 2.

Thus, the flexible antenna 20A shown in FIG. 36, when installed on the outer peripheral surface 70A of the column 70, can emit horizontally polarized waves by a part of or all of the four antenna elements 2 in each of the four directions with the column 70 as a center.

In particular, when the flexible antenna 20A shown in FIG. 36 is mounted to the outer peripheral surface 70A of the column 70 having a predetermined diameter, the four antenna elements 2 can be disposed respectively at 90° intervals with respect to the outer peripheral surface 70A. In this case, the flexible antenna 20A shown in FIG. 36 can emit horizontally polarized waves using a part of or all of the four antenna elements 2 for each of the four directions at 90° intervals with the column 70 as a center.

Further, in the flexible antenna 20A shown in FIG. 36, each of the 16 antenna elements 2 has an independent connection port. Therefore, the flexible antenna 20A shown in FIG. 36 can individually drive each of the 16 antenna elements 2 as necessary. Thus, for example, the flexible antenna 20A shown in FIG. 36 can freely control the beam forming direction in the vertical and horizontal directions, respectively, by the plurality of antenna elements 2. For example, the flexible antenna 20A shown in FIG. 36 can transmit a plurality of different signals simultaneously or with a time difference by the plurality of antenna elements 2.

Figure 37A:
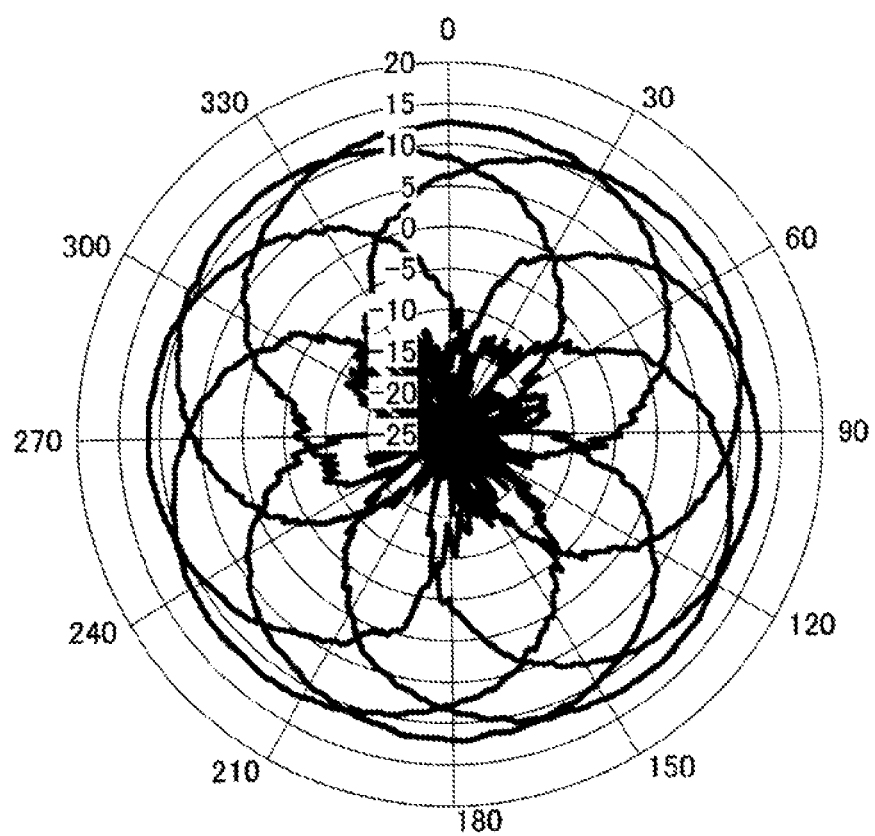
FIG. 37A is a diagram showing a first example of antenna characteristics of the flexible antenna according to the embodiment.
Figure 37B:
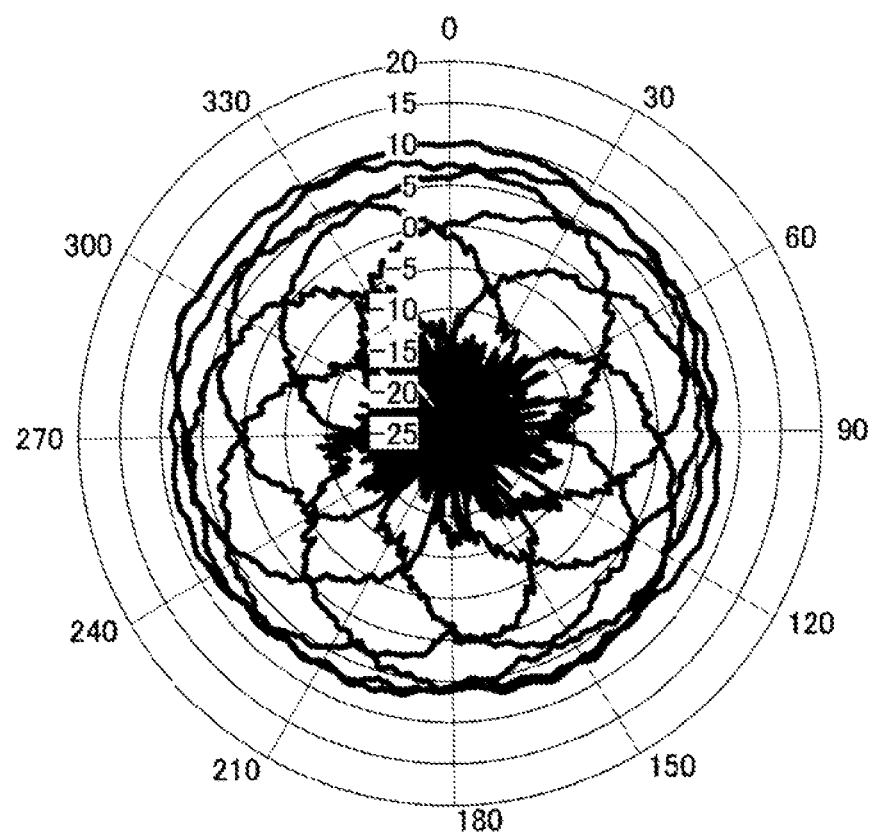
FIG. 37B is a diagram showing the first example of the antenna characteristics of the flexible antenna according to the embodiment.

FIGS. 37A and 37B are diagrams illustrating a first example of antenna characteristics of the flexible antenna 20A according to the embodiment of the present application. FIGS. 37A and 37B show the antenna characteristics in the 28 GHz band of each of the eight antennas in the XY plane when the flexible antenna 20A (vertical width of 100 mm and horizontal width of 430 mm) according to the embodiment is installed on the outer peripheral surface 70A of the column 70 (diameter of 140 mm) and eight antennas are provided on the flexible antenna 20A at 45° intervals. FIG. 37A is a diagram illustrating the antenna characteristics of the antenna for vertically polarized waves 22A. FIG. 37B is a diagram illustrating the antenna characteristics of the antenna for horizontally polarized waves 22B.

As shown in FIG. 37A, according to the flexible antenna 20A of the embodiment of the present application, by using the eight antennas, it is possible to emit vertically polarized waves with a sufficient gain (maximum gain of 12.5 dBi) in each of the eight directions arranged at 45° intervals with the column 70 as a center.

Further, as shown in FIG. 37B, according to the flexible antenna 20A of the embodiment of the present application, by using the eight antennas, it is possible to emit horizontally polarized waves with a sufficient gain (maximum gain of 10.4 dBi) in each of the eight directions arranged at 45° intervals with the column 70 as a center.

Figure 38A:
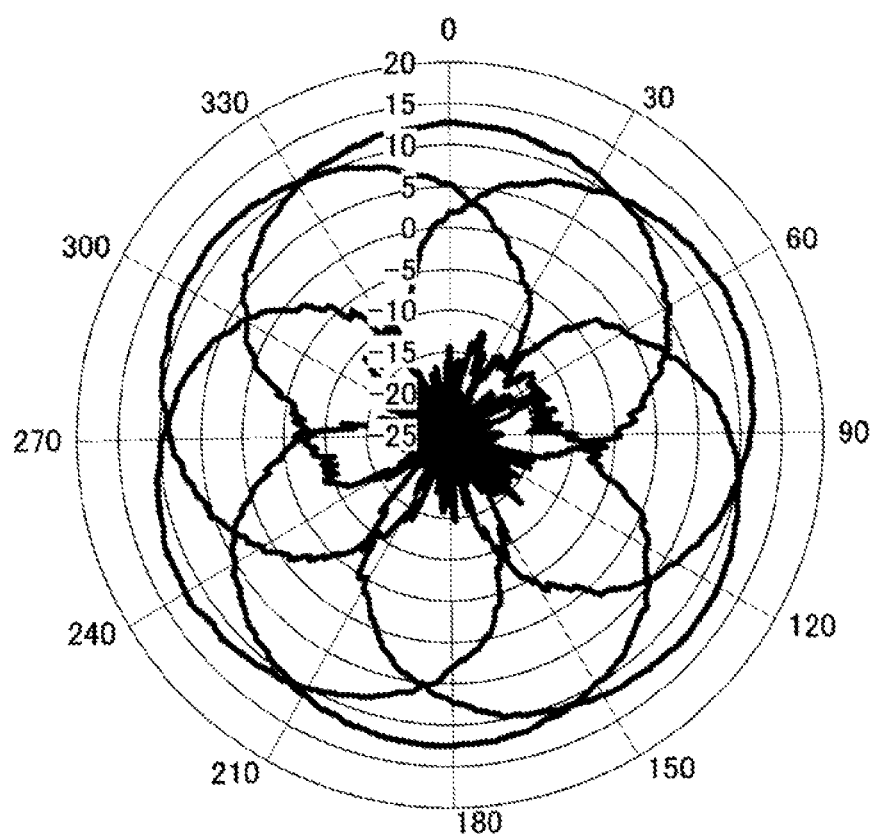
FIG. 38A is a diagram showing a second example of antenna characteristics of the flexible antenna according to the embodiment.
Figure 38B:
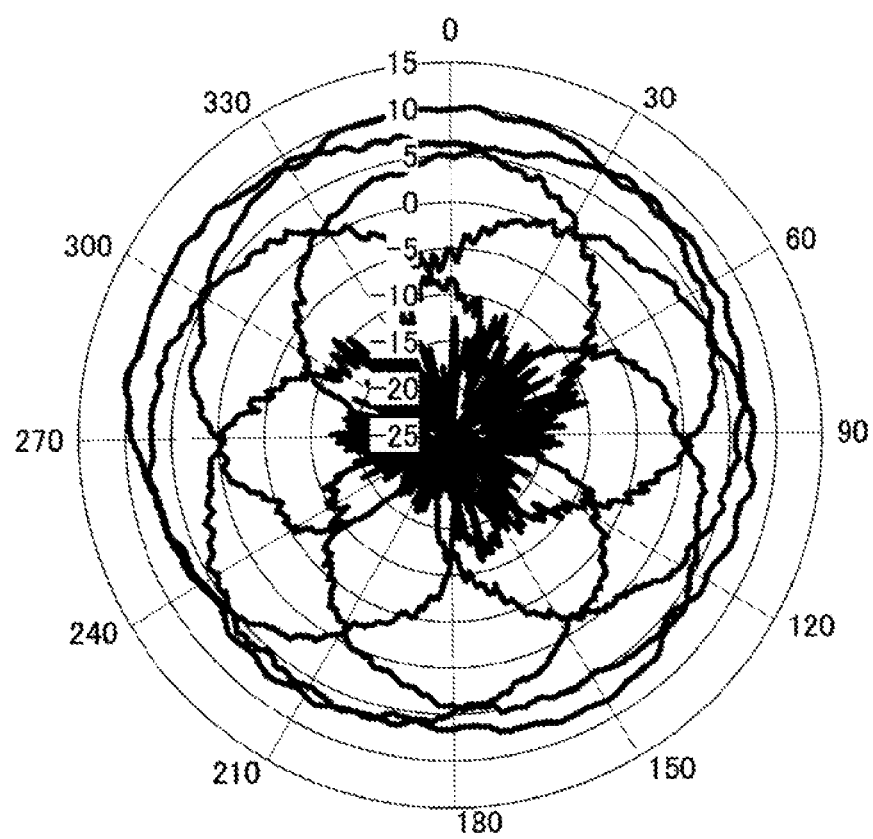
FIG. 38B is a diagram showing the second example of the antenna characteristics of the flexible antenna according to the embodiment.

FIGS. 38A and 38B are diagrams illustrating a second example of the antenna characteristics of the flexible antenna 20A according to the embodiment of the present application. FIGS. 38A and 38B show the antenna characteristics in the 28 GHz band of each of the six antennas in the XY plane when the flexible antenna 20A (vertical width of 100 mm and horizontal width of 430 mm) according to the embodiment is installed on the outer peripheral surface 70A of the column 70 (diameter of 140 mm) and six antennas are provided on the flexible antenna 20A at 60° intervals. FIG. 38A is a diagram illustrating the antenna characteristics of the antenna for vertically polarized waves 22A. FIG. 38B is a diagram illustrating the antenna characteristics of the antenna for horizontally polarized waves 22B.

As shown in FIG. 38A, according to the flexible antenna 20A of the embodiment of the present application, by using the six antennas, it is possible to emit vertically polarized waves with a sufficient gain (maximum gain 12.5 dBi) in each of the six directions arranged at 60° intervals with the column 70 as a center.

Further, as shown in FIG. 38B, according to the flexible antenna 20A of the embodiment of the present application, by using the six antennas, it is possible to emit horizontally polarized waves with a sufficient gain (maximum gain of 10.4 dBi) in each of the six directions arranged at 60° intervals with the column 70 as a center.

Figure 39A:
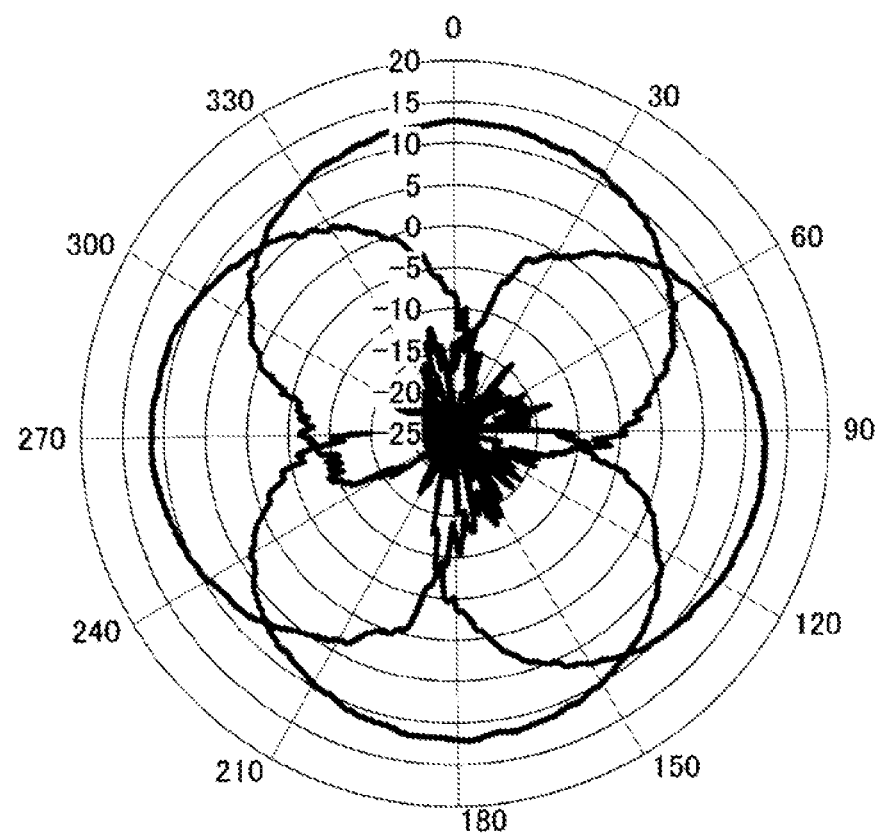
FIG. 39A is a diagram showing a third example of antenna characteristics of the flexible antenna according to the embodiment.
Figure 39B:
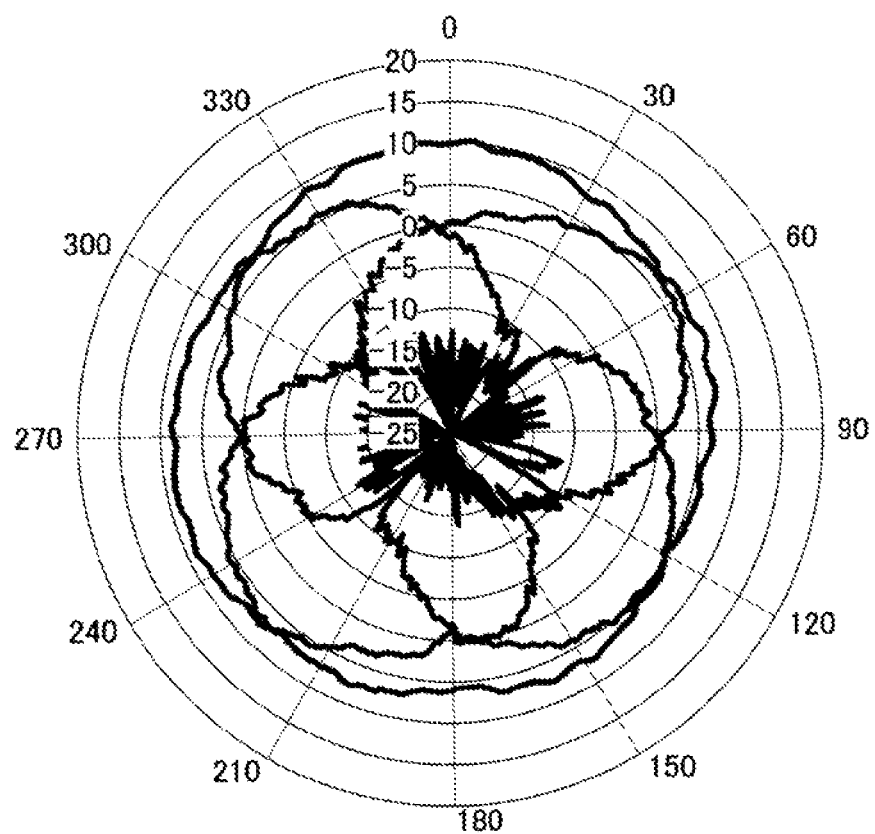
FIG. 39B is a diagram showing the third example of the antenna characteristics of the flexible antenna according to the embodiment.

FIGS. 39A and 39B are diagrams illustrating a third example of the antenna characteristics of the flexible antenna 20A according to the embodiment of the present application. FIGS. 39A and 39B show the antenna characteristics in the 28 GHz band of each of the four antennas in the XY plane when the flexible antenna 20A (vertical width of 100 mm and horizontal width of 430 mm) according to the embodiment is installed on the outer peripheral surface 70A of the column 70 (diameter of 140 mm) and four antennas are provided on the flexible antenna 20A at 90° intervals. FIG. 39A is a diagram illustrating the antenna characteristics of the antenna for vertically polarized waves 22A. FIG. 39B is a diagram illustrating the antenna characteristics of the antenna for horizontally polarized waves 22B.

As shown in FIG. 39A, according to the flexible antenna 20A of the embodiment of the present application, by using the four antennas, it is possible to emit vertically polarized waves with a sufficient gain (maximum gain of 12.5 dBi) in each of the four directions arranged at 90° intervals with the column 70 as a center.

Further, as shown in FIG. 39B, according to the flexible antenna 20A of the embodiment of the present application, by using the four antennas, it is possible to emit horizontally polarized waves with a sufficient gain (maximum gain of 10.4 dBi) in each of the four directions arranged at 90° intervals with the column 70 as a center.

Figure 40A:
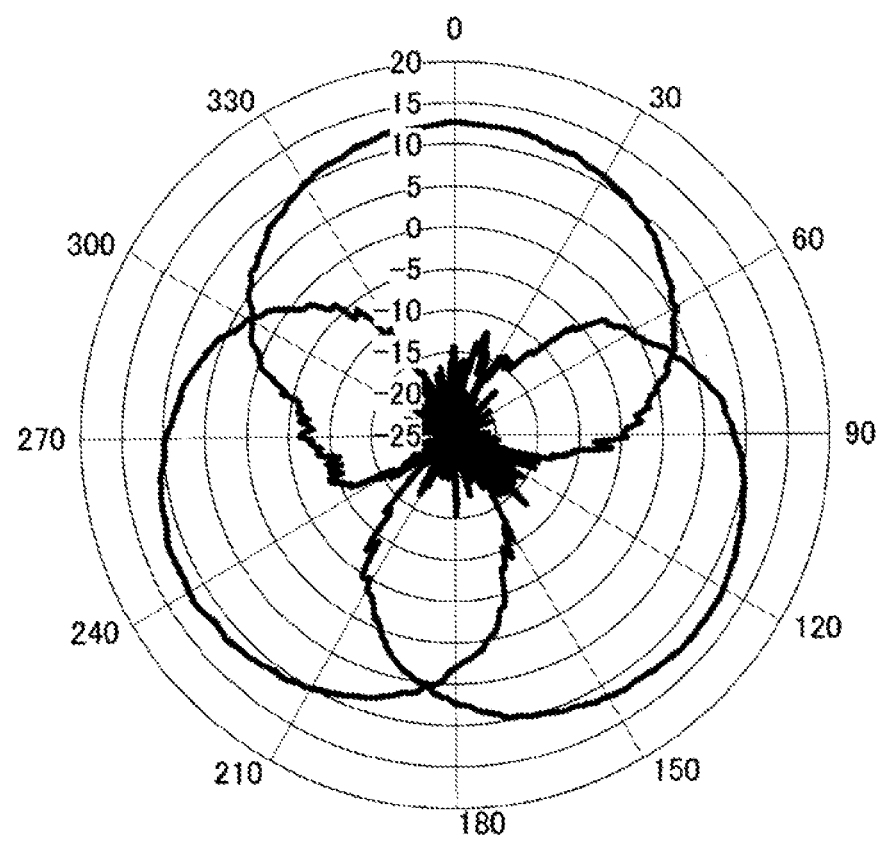
FIG. 40A is a diagram showing a fourth example of antenna characteristics of the flexible antenna according to the embodiment.
Figure 40B:
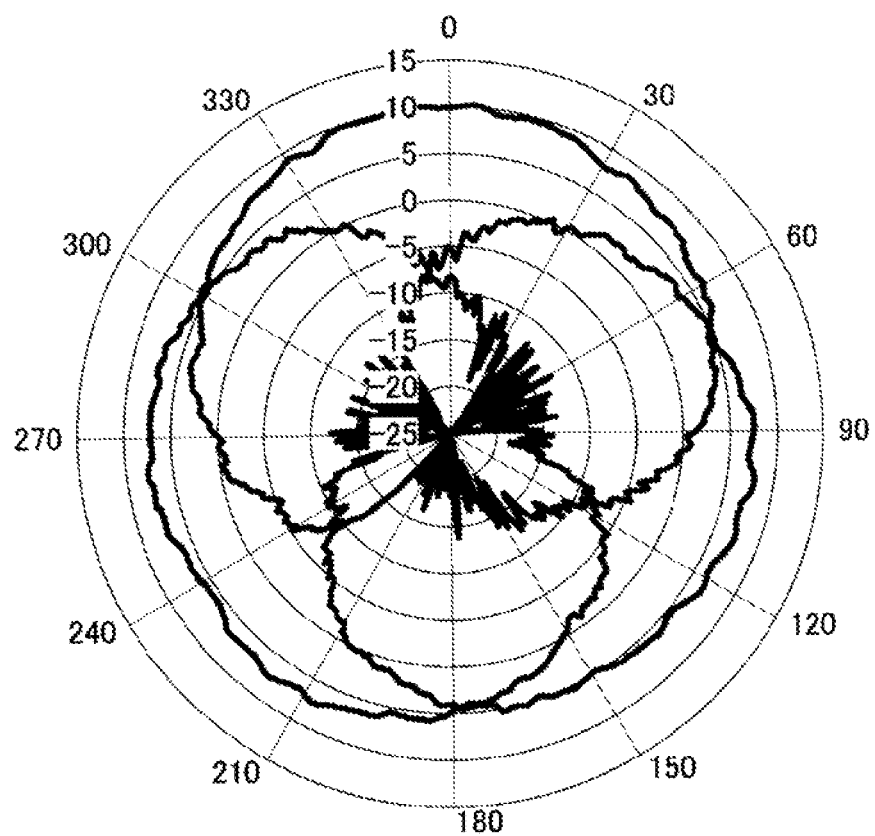
FIG. 40B is a diagram showing the fourth example of the antenna characteristics of the flexible antenna according to the embodiment.

FIGS. 40A and 40B are diagrams illustrating a fourth example of the antenna characteristics of the flexible antenna 20A according to the embodiment of the present application. FIGS. 40A and 40B show the antenna characteristics in the 28 GHz band of each of the three antennas in the XY plane when the flexible antenna 20A (vertical width of 100 mm and horizontal width of 430 mm) according to the embodiment is installed on the outer peripheral surface 70A of the column 70 (diameter of 140 mm) and three antennas are provided on the flexible antenna 20A at 120° intervals. FIG. 40A is a diagram illustrating the antenna characteristics of the antenna for vertically polarized waves 22A. FIG. 40B is a diagram illustrating the antenna characteristics of the antenna for horizontally polarized waves 22B.

As shown in FIG. 40A, according to the flexible antenna 20A of the embodiment of the present application, by using the three antennas, it is possible to emit vertically polarized waves with a sufficient gain (maximum gain of 12.5 dBi) in each of the three directions arranged at 120° intervals with the column 70 as a center.

Further, as shown in FIG. 40B, according to the flexible antenna 20A of the embodiment of the present application, by using the three antennas, it is possible to emit horizontally polarized waves with a sufficient gain (maximum gain of 10.4 dBi) in each of the three directions arranged at 120° intervals with the column 70 as a center.

Figure 41A:
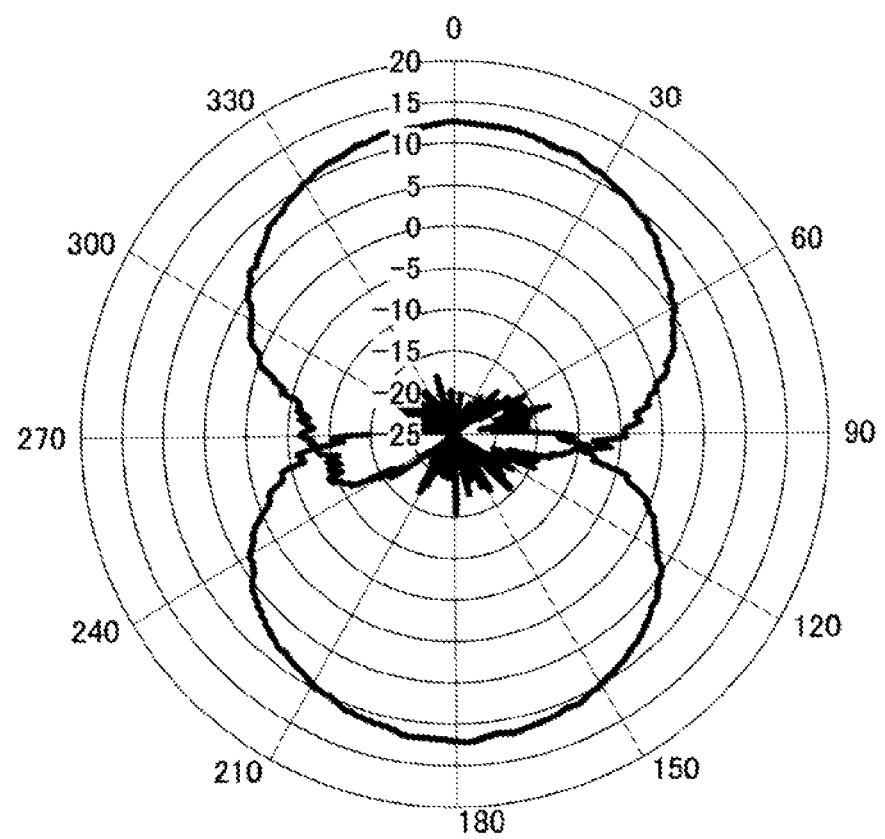
FIG. 41A is a diagram showing a fifth example of antenna characteristics of the flexible antenna according to the embodiment.
Figure 41B:
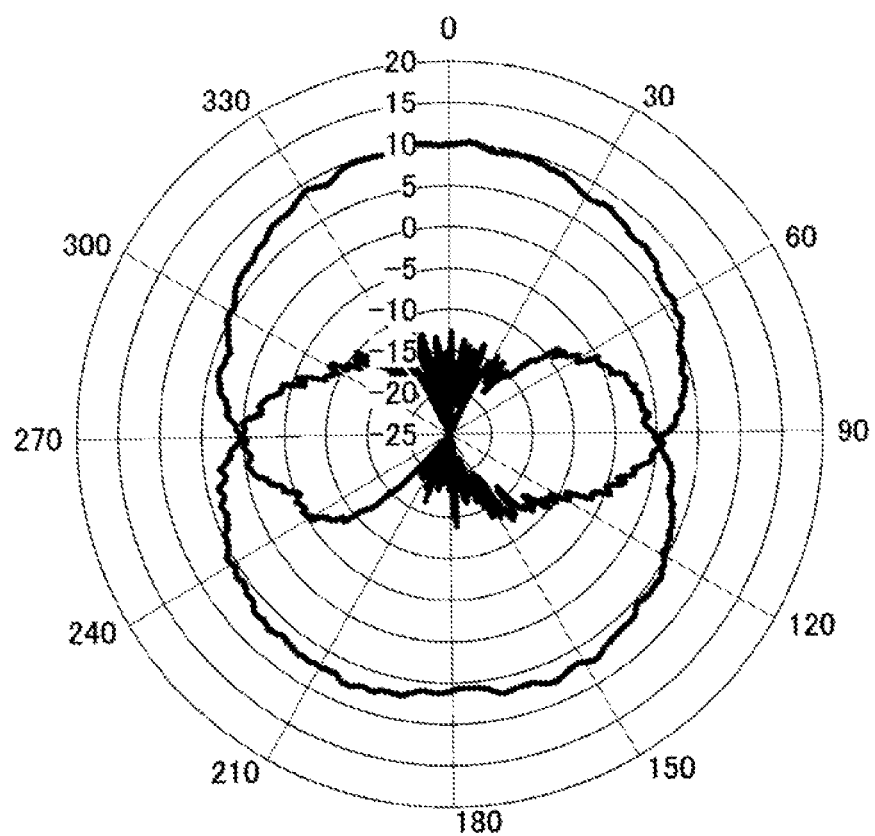
FIG. 41B is a diagram showing the fifth example of the antenna characteristics of the flexible antenna according to the embodiment.

FIGS. 41A and 41B are diagrams illustrating a fifth example of the antenna characteristics of the flexible antenna 20A according to the embodiment of the present application. FIGS. 41A and 41B show the antenna characteristics in the 28 GHz band of each of the two antennas in the XY plane when the flexible antenna 20A (vertical width of 100 mm and horizontal width of 430 mm) according to the embodiment is installed on the outer peripheral surface 70A of the column 70 (diameter of 140 mm) and two antennas are provided on the flexible antenna 20A at 180° intervals. FIG. 41A is a diagram illustrating the antenna characteristics of the antenna for vertically polarized waves 22A. FIG. 41B is a diagram illustrating the antenna characteristics of the antenna for horizontally polarized waves 22B.

As shown in FIG. 41A, according to the flexible antenna 20A of the embodiment of the present application, by using the two antennas, it is possible to emit vertically polarized waves with a sufficient gain (maximum gain of 12.5 dBi) in each of the two directions arranged at 180° intervals with the column 70 as a center.

Also, as shown in FIG. 41B, according to the flexible antenna 20A of the embodiment of the present application, by using the two antennas, it is possible to emit horizontally polarized waves with a sufficient gain (maximum gain of 10.4 dBi) in each of the two directions arranged at 180° intervals with the column 70 as a center.

According to the antenna characteristics illustrated in FIGS. 37A to 41B, to cover all directions of the periphery of the column 70, the flexible antenna 20A according to the embodiment preferably includes at least two antennas, and more preferably includes three or more antennas.

Figure 42:
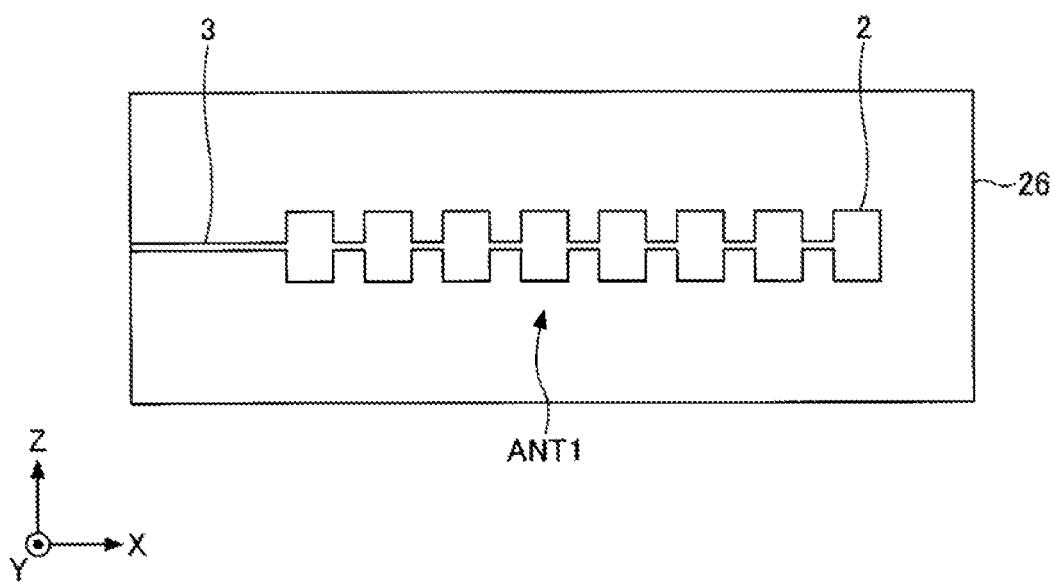
FIG. 42 is a diagram depicting an example of an antenna pattern in a flexible antenna according to a fourth variation of the embodiment.
Figure 43:
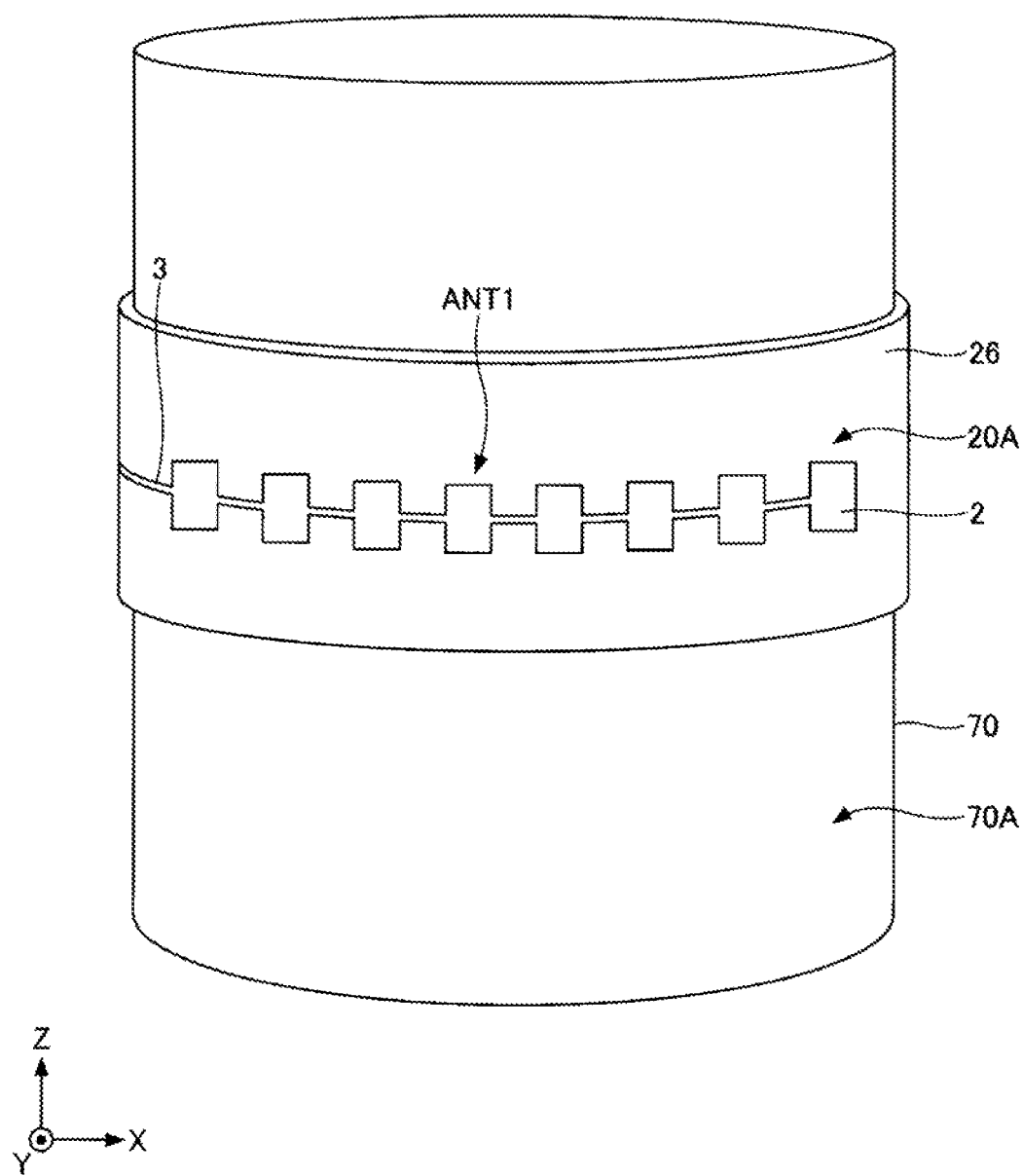
FIG. 43 is a diagram illustrating an example of the flexible antenna shown in FIG. 42 mounted on a column.

FIG. 42 is a diagram illustrating an antenna pattern in the flexible antenna 20A according to a fourth variation of the embodiment of the present application. FIG. 43 is a diagram illustrating an example of the flexible antenna shown in FIG. 42 disposed on the column 70.

In the example shown in FIGS. 42 and 43, the flexible antenna 20A has one antenna ANT1 extending in the horizontal direction HD on the surface of the flexible substrate 26. The antenna ANT1 has eight antenna elements 2 arranged side by side in the horizontal direction HD. In the antenna ANT1, the eight antenna elements 2 are connected in series through the transmission lines 3 extending linearly in the horizontal direction HD.

Thus, the flexible antenna 20A shown in FIGS. 42 and 43, when placed on the outer peripheral surface 70A of the column 70, as shown in FIG. 43, by using the eight antenna elements 2, it is possible to emit horizontally polarized waves in the eight directions with the column 70 as a center.

In particular, the flexible antenna 20A shown in FIGS. 42 and 43 has a single connection port connected to each of the eight antenna elements 2. Therefore, the flexible antenna 20A shown in FIGS. 42 and 43 can simultaneously drive the eight antenna elements 2 by supplying a drive signal from the signal processing circuit 4 to the single connection port, i.e., it is possible to emit horizontally polarized waves simultaneously in the eight directions.

Figure 44A:
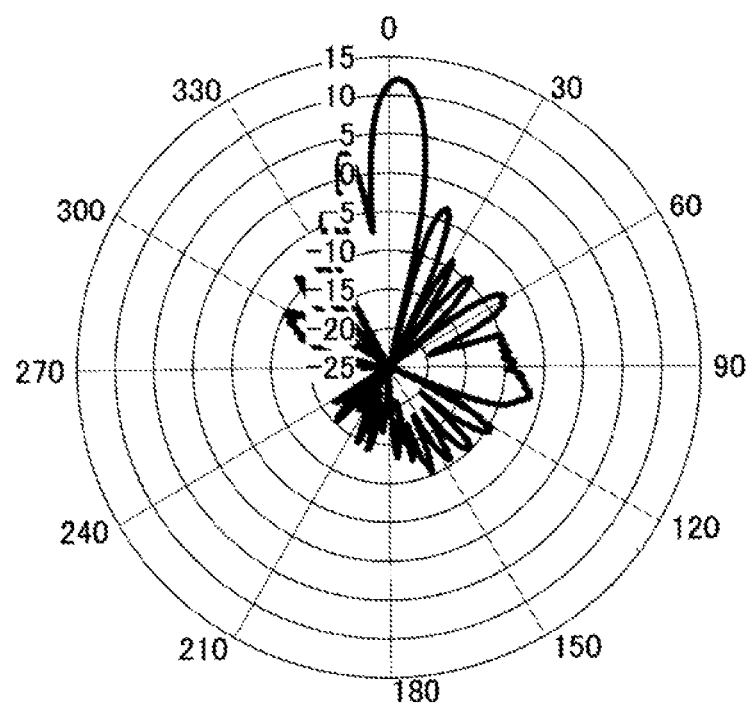
FIG. 44A is a diagram showing an example of antenna characteristics of the flexible antenna shown in FIG. 42.
Figure 44B:
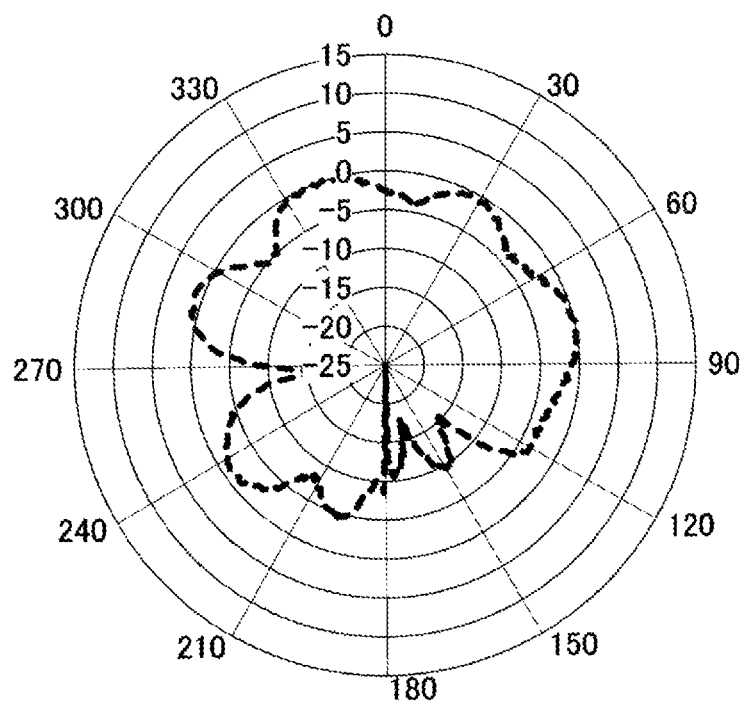
FIG. 44B is a diagram showing the example of the antenna characteristics of the flexible antenna shown in FIG. 42.

FIGS. 44A and 44B are diagrams illustrating an example of the antenna characteristics of the flexible antenna 20A shown in FIG. 42. FIG. 44A shows an antenna characteristic in the 28 GHz band of the antenna ANT1 in the YX plane in the flexible antenna 20A alone (vertical width of 15 mm and horizontal width of 60 mm) shown in FIG. 42. FIG. 44B shows the antenna characteristic in the 28 GHz band of the antenna ANT1 in the YX plane when the flexible antenna 20A (vertical width of 15 mm and horizontal width of 60 mm) shown in FIG. 42 is installed on the outer peripheral surface 70A of the column 70 (diameter of 25 mm).

As shown in FIG. 44B, according to the flexible antenna 20A shown in FIG. 42, using the antenna ANT1 provided with the eight antenna elements 2, it is possible to emit horizontally polarized waves with a sufficient gain (maximum gain of 1 dBi) in each of the eight directions with the column 70 as a center.

The configuration shown in the above-described embodiment is an example of contents of the present disclosure. The configuration may be combined with other publicly known technology. A part of the configuration may be omitted or changed without departing from the scope of the present disclosure.

What is claimed is:

1. A distributed antenna comprising:
   a strip member extending in a strip-like shape including a dielectric body of a plate shape having a first surface that is one surface of the dielectric body and a second surface that is opposite to the first surface;
   a transmission line provided on the first surface, on the second surface, or between the first surface and the second surface;
   a plurality of antenna elements electrically connected to the transmission line and disposed in a distributed manner on the first surface or on the second surface, or electrically connected to the transmission line and disposed in a distributed manner between the first surface and the second surface;
   a signal processing circuit provided on the strip member, the signal processing circuit processing a signal transmitted to the transmission line, the signal processing circuit including a plurality of amplifiers and a plurality of mixers that up-convert or down-convert a signal transmitted to the transmission line; and
   a power wiring provided on the strip member, the power wiring supplying power that drives the signal processing circuit,
   wherein the strip member includes a flexible member having flexibility,
   wherein a transmission distance between an antenna element of the plurality of antenna elements and a mixer of the plurality of mixers is greater than 0.8 m.

2. The distributed antenna according to claim 1 further comprising:
   a signal processing circuit provided on the strip member, the signal processing circuit including
   a digital to analog converter (DAC) that converts a digital signal transmitted from a base station into an analog signal and transmits the analog signal to a mixer, and
   an analog to digital converter (ADC) that converts an analog signal transmitted from the mixer into a digital signal and transmits the digital signal to the base station.

3. The distributed antenna according to claim 1,
   wherein the transmission line includes a first transmission line, and a second transmission line branched from the first transmission line, and
   wherein the antenna element is connected to the second transmission line.

4. The distributed antenna according to claim 1,
   wherein the antenna element is provided on the transmission line.

5. The distributed antenna according to claim 1, wherein:
   the strip member includes a flexible portion having flexibility, and a rigid portion, and
   the rigid portion and the flexible portion are spaced apart from each other and connected by a connector.

6. The distributed antenna according to claim 1 further comprising:
   a signal processing circuit provided on the strip member, the signal processing circuit including a local transmitter that is a local signal source for a mixer.

7. The distributed antenna according to claim 1 further comprising:
   a member covering the transmission line.

8. The distributed antenna according to claim 1,
   wherein the plurality of antenna elements are provided side by side in a horizontal direction on a surface of the strip member, and
   wherein the transmission line is a single transmission line connected to each of the plurality of antenna elements.

9. The distributed antenna according to claim 8,
   wherein the plurality of antenna elements are disposed side by side equally spaced in the horizontal direction.

10. The distributed antenna according to claim 1,
    wherein the plurality of antenna elements are disposed side by side in a horizontal direction and in a vertical direction to form a matrix, and
    wherein the transmission line includes a plurality of transmission lines provided for the plurality of antenna elements, respectively.

11. A distributed antenna system comprising:
    a base station;
    the distributed antenna according to claim 1; and
    a communication line.

12. The distributed antenna according to claim 1, wherein:
    the strip member comprises a flexible portion having flexibility, and a rigid portion, and
    the flexible portion has a larger length than the rigid portion along a longitudinal direction of the strip member.

* * * * *